US008064528B2

(12) United States Patent  
Giannakis et al.

(10) Patent No.: US 8,064,528 B2  
(45) Date of Patent: Nov. 22, 2011

(54) ESTIMATING FREQUENCY-OFFSETS AND MULTI-ANTENNA CHANNELS IN MIMO OFDM SYSTEMS

(75) Inventors: Georgios B. Giannakis, Minnetonka, MN (US); Xiaoli Ma, Auburn, AL (US)

(73) Assignee: Regents of the University of Minnesota, St. Paul, MN (US)

( * ) Notice: Subject to any disclaimer, the term of this patent is extended or adjusted under 35 U.S.C. 154(b) by 1645 days.

(21) Appl. No.: 10/850,961

(22) Filed: May 21, 2004

(65) Prior Publication Data

US 2011/0255572 A1    Oct. 20, 2011

Related U.S. Application Data

(60) Provisional application No. 60/472,297, filed on May 21, 2003.

(51) Int. Cl.  
*H04L 27/28* (2006.01)
(52) U.S. Cl. ........................................ 375/260
(58) Field of Classification Search .................. 375/130, 375/132, 260, 362, 365, 366, 368; 370/281, 370/295, 478; 455/59, 112, 216  
See application file for complete search history.

(56) References Cited

U.S. PATENT DOCUMENTS

| | | |
|---|---|---|
| 5,127,051 A | 6/1992 | Chan et al. |
| 6,088,408 A | 7/2000 | Calderbank et al. |
| 6,188,717 B1 | 2/2001 | Kaiser et al. |
| 6,441,786 B1 | 8/2002 | Jasper et al. |
| 6,449,245 B1 | 9/2002 | Ikeda et al. |
| 6,487,253 B1 | 11/2002 | Jones, IV et al. |
| 6,707,856 B1 | 3/2004 | Gardner et al. |
| 6,850,481 B2 | 2/2005 | Wu et al. |
| 6,865,175 B1 | 3/2005 | Ritter |
| 6,959,010 B1 | 10/2005 | Bahrenburg et al. |
| 7,009,931 B2* | 3/2006 | Ma et al. ................ 370/208 |
| 7,065,371 B1 | 6/2006 | Kleinerman |
| 7,161,973 B2 | 1/2007 | Ghosh |
| 2002/0122502 A1 | 9/2002 | El-Gamal et al. |
| 2002/0126740 A1 | 9/2002 | Giannakis et al. |
| 2002/0136327 A1 | 9/2002 | El-Gamal et al. |
| 2002/0146078 A1 | 10/2002 | Gorokhov et al. |
| 2003/0072452 A1 | 4/2003 | Mody et al. |
| 2003/0081569 A1 | 5/2003 | Sexton et al. |
| 2003/0156594 A1 | 8/2003 | Trott et al. |
| 2003/0169824 A1 | 9/2003 | Chayat |
| 2004/0013211 A1 | 1/2004 | Lindskog et al. |
| 2004/0037214 A1 | 2/2004 | Blasco Claret et al. |
| 2004/0120410 A1* | 6/2004 | Priotti ....................... 375/260 |
| 2004/0166887 A1* | 8/2004 | Laroia et al. .............. 455/522 |

(Continued)

OTHER PUBLICATIONS

U.S. Appl. No. 60/449,729, p. 1-25, filed on Feb. 24, 2003.*

(Continued)

*Primary Examiner* — Sam K Ahn  
(74) *Attorney, Agent, or Firm* — Shumaker & Sieffert, P.A.

(57) ABSTRACT

Techniques are described for carrier frequency offset (CFO) and channel estimation of orthogonal frequency division multiplexing (OFDM) transmissions over multiple-input multiple-output (MIMO) frequency-selective fading channels. A wireless transmitter forms blocks of symbols by inserting training symbols within two or more blocks of information-bearing symbols. The transmitter applies a hopping code to each of the blocks of symbols to insert a null subcarrier at a different position within each of the blocks of symbols, and a modulator outputs a wireless signal in accordance with the blocks of symbols. A receiver receives the wireless signal and estimates the CFO, and outputs a stream of estimated symbols based on the estimated CFO.

43 Claims, 12 Drawing Sheets

U.S. PATENT DOCUMENTS

2004/0190636 A1* 9/2004 Oprea .......................... 375/260
2005/0058217 A1 3/2005 Sandhu et al.

OTHER PUBLICATIONS

B.M. Hochwald et al., "Achieving Near-Capacity on a Multiple-Antenna Channel," IEEE Transactions on Communication, vol. 51, No. 3, pp. 389-399, Mar. 2003.
G.J. Saulnier et al, "Performance of an OFDM Spread Spectrum Communications system Using Lapped Transforms," in Proc. MILCOM Conf., vol. 2, 1997, pp. 608-612.
G.J. Saulnier et al., "Performance of a Spread Spectrum OFDM System in a Dispersive Fading Channel with Interference," in Proc. MILCOM Conf., vol. 2, 1998, pp. 679-683.
I. Koffman et al., "Broadband Wireless Access Solutions Based on OFDM Access in IEEE 802.16," IEEE Communications Magazine, vol. 40, No. 4, pp. 96-103, Apr. 2002.
L. Wei et al., "Space-Time-Frequency Block Coding Over Rayleigh Fading Channels for OFDM Systems," Proceedings of the International Conference on Communication Technology, ICCT 2003, vol. 2, pp. 1008-1012, Apr. 2003.
L. Wei et al., "Synchronization Requirements for Multi-user OFDM on Satellite Mobile and Two-Path Rayleigh Fading Channels," IEEE Transactions on Communications, vol. 43, No. 2/3/4, pp. 887-895, Feb.-Apr. 1995.
N. Yee et al., "BER of Multi-Carrier CDMA in an Indoor Rician Fading Channel," Conference Record of the Twenty-Seventh Asilomar Conference on Signals, Systems and Computers, pp. 426-430, 1993.
P. Xia et al., "Bandwidth-and Power-Efficient Multicarrier Multiple Access," IEEE Transactions on Communications, vol. 51, No. 11, pp. 1828-1837, Nov. 2003.
S. Kaiser et al., "A Flexible Spread-Spectrum Multi-Carrier Multiple-Access System for Multi-Media Applications," in Procedures of 8$^{th}$ IEEE International Symposium PIMRC, vol. 1, 1997, pp. 100-104.
S. Zhou et al, "Frequency-Hopped Generalized MC-CDMA for Multipath and Interference Suppression," in Proc. MILCOM Conf., vol. 2, Los Angeles, CA Oct. 22-25, 2000, pp. 937-941.
W.Y. Zou et al., "COFDM: An Overview," IEEE Transactions on Broadcasting, vol. 41, No. 1, pp. 1-8, Mar. 1995.
Y. Xin et al., "Space-Time Constellation-Rotating Codes Maximizing Diversity and Coding Gains," in Procedures of Global Telecommunications Conference, Nov. 2001, pp. 455-459.
Z. Wang et al, "Complex-Field Coding for OFDM Over Fading Wireless Channels," IEEE Transactions on Information Theory, vol. 49, No. 3, pp. 707-720, Mar. 2003.
Z. Wang et al., "Joint Coding-Precoding with Low-Complexity Turbo Decoding," IEEE Transactions on Wireless Communications, vol. XXX, No. XXX, pp. 1-11, 2003.
M. Guillaud et al., "Multi-Stream Coding for MIMO OFDM Systems With Space-Time-Frequency Spreading," Wireless Personal Multimedia Communications, the 5$^{th}$ International Symposium, vol. 1, pp. 120-124, Oct. 27-30, 2002.
Y. Gong et al., "Space-Frequency-Time Coded OFDM for Broadband Wireless Communications," Global Telecommunications Conference, GLOBECOM '01, IEEE, Vo. 1, pp. 519-523, Nov. 25-29, 2001.
Zhengdao Wang et al., "Linearly Precoded or Coded OFDM Against Wireless Channel Fades?," Third IEEE Signal Processing Workshop on Signal Processing Advances in Wireless Communications, Taoyuan, Taiwan, pp. 267-270, Mar. 20-23, 2001.
Srihari Adireddy et al., "Optimal Embedding of Known Symbols for OFDM," in Procedures International Conference, ASSP, vol. 4, Salt Lake City, UT, May 2001.
Yan Xin et al., "Space-Time Diversity Systems Based on Linear Constellation Precoding," IEEE Transactions on Wireless Communications, vol. 2, No. 2, pp. 294-309, Mar. 2003.
Yan Xin et al., "Space-Time Diversity Systems Based on Unitary Constellation-Rotating Precoders," in Procedures International Conference, Speech, Signal Process., Salt Lake City, UT, pp. 2429-2432, May 7-11, 2001.

Alexandra Duel-Hallen et al., "Long-Range Predication of Fading Channels," IEEE Signal Processing Magazine, pp. 62-75, May 2000.
Anastasios Stamoulis et al., "Block FIR Decision-Feedback Equalizers for Filterbank Precoded Transmissions with Blind Channel Estimation Capabilities," IEEE Transactions on Communications, vol. 49, No. 1, pp. 69-83, Jan. 2001.
Anders Furuskar et al., "EDGE: Enhanced Data Rates for GSM and TDMA/136 Evolution," IEEE Personal Communications, vol. 6, No. 3, pp. 56-66, Jun. 1999.
Amos Lapidoth et al., "Fading Channels: How Perfect Need "Perfect Side Information" be?," in Procedures IEEE Information Theory Communications Workshop, pp. 36-38, Jun. 1999.
Ayman F. Naguib et al., "Increasing Data Rate Over Wireless Channels," IEEE Signal Processing Magazine, vol. 17, pp. 76-92, May 2000.
Akbar M. Sayeed et al., "Joint Multipath-Doppler Diversity in Mobile Wireless Communications," IEEE Transactions on Communications, vol. 47, No. 1, pp. 123-132, Jan. 1999.
A.P. Clark et al., "Adaptive Channel Estimator for an HF Radio Link," IEEE Transactions on Communications, vol. 37, No. 9, pp. 918-926, Sep. 1989.
Anna Scaglione et al., "Filterbank Transceivers Optimizing Information Rate in block Transmissions Over Dispersive Channels," IEEE Transactions on Information Theory, vol. 45, No. 3, pp. 1019-1032, Apr. 1999.
Anna Scaglione et al., "Redundant Filterbank Precoders and Equalizers Part I: Unification and Optimal Designs," IEEE Transactions on Signal Processing, vol. 47, No. 7, pp. 1988-2022, Jul. 1999.
Anna Scaglione et al., "Redundant Filterbank Precoders and Equalizers Part II: Blind Channel Estimation, Synchronization, and Direct Equalization," IEEE Transactions on Signal Processing, vol. 47, No. 7, pp. 2007-2022, Jul. 1999.
B. Muquet et al., "Reduced Complexity Equalizers for Zero-Padded OFDM Transmissions," Procedures of International Conference on ASSP, vol. 5, pp. 2973-2976, Jun. 2000.
Babak Hassibi et al., "How Much Training is Needed in Multiple-Antenna Wireless Links?" IEEE Transactions on Information Theory, vol. 49, No. 4, pp. 951-963, Apr. 2003.
Ben Lu et al., "Space-Time Code Design in OFDM Systems," in Procedures Global Telecommunications Conference, vol. 2, San Francisco, CA, pp. 1000-1004, Nov. 27-Dec. 1, 2000.
Cristian Budianu et al., "Channel Estimation for Space-Time Orthogonal Block Codes," IEEE Transactions on Signal Processing, vol. 50, No. 10, pp. 2515-2528, Oct. 2002.
C. Fragouli et al., "Finite-Alphabet Constant-Amplitude Training Sequence for Multiple-Antenna Broadband Transmissions," Procedures of IEEE International Conference on Communications, vol. 1, pp. 6-10, NY City, Apr. 28-May 1, 2002.
C. Fragouli et al., "Reduced-Complexity Training Schemes for Multiple-Antenna Broadband Transmissions," Procedure of Wireless Communications and Networking Conference, vol. 1, pp. 78-83, Mar. 17-21, 2002.
Cihan Tepedelenlioglu et al., "Transmitter Redundancy for Blind Estimation and Equalization of Time-and Frequency-Selective Channels," IEEE Transactions on Signal Processing, vol. 48, No. 7, pp. 2029-2043, Jul. 2000.
Dakshi Agrawal et al., "Space-Time Coded OFDM High Data-Rate Wireless Communication Over Wideband Channels," in Procedures on Vehicle Technology Conference, Ottawa, ON, Canada, pp. 2232-2236, May 18-21, 1998.
Deva K. Borah et al., "Frequency-Selective Fading Channel Estimation with a Polynomial Time-Varying Channel Model," IEEE Transactions on Communications, vol. 47, No. 6, pp. 862-873, Jun. 1999.
Dennis L. Goeckel, "Coded Modulation With Non-Standard Signal Sets for Wireless OFDM Systems," in Procedures International Conference Communications, Vancouver, BC, Canada, pp. 791-795, Jun. 1999.
Ezio Biglieri et al., "Fading Channels: Information-Theoretic and Communications Aspects," IEEE Transactions on Information Theory, vol. 44, No. 6, pp. 2619-2692, Oct. 1998.
Emanuele Viterbo et al., "A Universal Lattice Code Decoder for Fading Channels," IEEE Transactions on Information Theory, vol. 45, No. 5, pp. 1639-1642, Jul. 1999.

E. Lindskog et al, "A Transmit Diversity Scheme for Channels With Intersymbol Interference," Procedures of ICC, vol. 1, pp. 307-311, Jun. 2000.

Frederick W. Vook et al., "Transmit Diversity Schemes for Broadband Mobile Communication Systems," Procedures of IEEE VTC, vol. 6, pp. 2523-2529, 2000.

Fredrik Tufvesson et al., "OFDM Time and Frequency Synchronization by Spread Spectrum Pilot Technique," in Procedures 8$^{th}$ Communication Theory Mini-Conference, Vancouver, BC, Canada, pp. 1-5, Jun. 1999.

Georgios B. Giannakis, "Cyclostationary Signal Analysis," The Digital Signal Processing Handbook, V.K. Madisetti and D. Williams, Eds. Boca Raton, FL: CRC, Chapter 17, 1998.

Georgios B. Giannakis et al., "Basis Expansion Models and Diversity Techniques for Blind Identification and Equalization of Time-Varying Channels," Proceedings of the IEEE, vol. 86, No. 10, pp. 1969-1986, Oct. 1998.

Georgios B. Giannakis, "Filterbanks for Blind Channel Identification and Equalization," IEEE Signal Processing Letters, vol. 4, No. 6, pp. 184-187, Jun. 1997.

Gerard J. Foschini, "Layered Space-Time Architecture for Wireless Communications in a Fading Environment When Using Multi-Element Antennas," Bell Labs Technical Journal, vol. 1, No. 2, pp. 41-59, 1996.

Gassan Kawas Kaleh, "Channel Equalization for Block Transmission Systems," IEEE Journal on Selected Areas in Communications, vol. 13, No. 1, pp. 110-121, Jan. 1995.

H. Vincent Poor, "Probability of Error in MMSE Multiuser Detection," IEEE Transaction on Information Theory, vol. 43, No. 3, pp. 858-871, May 1997.

Helmut Bolcskei et al., "Blind Channel Identification and Equalization in OFDM-Based Multiantenna Systems, "IEEE Transactions on Signal Processing, vol. 50, No. 1, pp. 96-109, Jan. 2002.

Helmut Boleskei et al., "Space-Frequency Coded Broadband OFDM Systems," Invited paper, presented at IEEE WCNC 2000, Chicago, pp. 1-6, Sep. 2000.

Helmut Bolcskei et al., "Space-Frequency Codes for Broadband Fading Channels," in International Symposium Information Theory, Washington, DC, 1 page, Jun. 2001.

Hui Liu et al., "A High-Efficiency Carrier Estimator for OFDM Communications," IEEE Communications Letters, vol. 2, No. 4, pp. 104-106, Apr. 1998.

Hikmet Sari et al., "Transmission Techniques for Digital Terrestrial TV Broadcasting," IEEE Communications Magazine, vol. 33, pp. 100-103, Feb. 1995.

H. Vikalo et al., "Optimal Training for Frequency-Selective Fading Channels," Procedures of International Conference on ASSP, Salt Lake City, Utah, vol. 4, pp. 2105-2108, May 7-11, 2001.

I. Barhumi et al., "Optimal Training Sequences for Channel Estimation in MIMO OFDM Systems in Mobile Wireless Communications," Procedures of International Zurich Seminar on Access, Transmission, Networking of Broadband Communications, 6 pgs., ETH Zurich, Switzerland, Feb. 19-21, 2002.

I.Emre Telatar, "Capacity of Multiple-Antenna Gaussian Channels," European Transactions Telecommunications, vol. 10, pp. 1-28, Nov.-Dec. 1998.

Jens Baltersee et al., "Achievable Rate of MIMO Channels With Data-Aided Channel Estimation and Perfect interleaving," IEEE Journal on Selected Areas in Communication, vol. 19, No. 12, 2358-2368, Dec. 2001.

J. Boutros et al., "Signal Space Diversity: A Power and Bandwidth Efficient Diversity Technique for the Rayleigh Fading Channel," IEEE Transactions Information Theory, vol. 44, pp. 1-34, Jul. 1998.

Jerome A. Gansman et al., "Optimum and Suboptimum Frame Synchronization for Pilot-Symbol-Assisted Modulation," IEEE Transactions on Communciations, vol. 45, No. 10, pp. 1327-1337, Oct. 1997.

Jiann-Cing Guey et al., "Signal Design for Transmitter Diversity Wireless Systems Over Rayleigh Fading Channels," IEEE Transactions on Communications, vol. 47, No. 4, pp. 527-537, Apr. 1999.

Jonathan H. Manton et al., "Affine Precoders for Reliable Communications," in Procedures International Conference ASSP, vol. 5, Istanbul, Turkey, pp. 2749-2752, Jun. 2000.

James K. Cavers, "Pilot Symbol Assisted Modulation and Differential Detection in Fading and Delay Spread," IEEE Transactions on Communications, vol. 43, No. 7, pp. 2206-2212, Jul. 1995.

James K. Cavers, "An Analysis of Pilot Symbol Assisted Modulation for Rayleigh Fading Channels," IEEE Transactions on Vehicular Technology, vol. 40, No. 4, pp. 686-693, Nov. 1991.

John A.C. Bingham, "Multicarrier Modulation for Data Transmission: An Idea Whose Time Has Come," IEEE Communications Magazine, pp. 5-14, May 1990.

Jitendra K. Tugnait et al., "Second-Order Statistics-Based Blind Equalization of IIR Single-Input Multiple-Output Channels with Common Zeros," IEEE Transactions on Signal Processing, vol. 47, No. 1, pp. 147-157, Jan. 1999.

Linda M. Davis et al., "Joint MAP Equalization and Channel Estimation for Frequency-Selective and Frequency-Flat Fast-Fading Channels," IEEE Transactions on communications, vol. 49, No. 12, pp. 2106-2114, Dec. 2001.

Lizhong Zheng et al., "Communication on the Grassmann Manifold: A Geometric Approach to the Noncoherent Multiple-Antenna Channel," IEEE Transactions on Information Theory, vol. 48, No. 2, pp. 359-383, Feb. 2002.

Min Dong et al., "Optimal Design and Placement of Pilot Symbols for Channel Estimation," IEEE Transactions on Signal Processing, vol. 50, No. 12, pp. 3055-3069, Dec. 2002.

Massimiliano (Max) Martone, "Wavelet-Based Separating Kernels for Sequence Estimation with Unknown Rapidly Time-Varying Channels," IEEE Communications Letter, vol. 3, No. 3, pp. 78-80, Mar. 1999.

Muriel Medard, "The Effect Upon Channel Capacity in Wireless Communications of Perfect and Imperfect Knowledge of the Channel," IEEE Transactions on Information Theory, vol. 46, No. 3, pp. 933-946, May 2000.

Michele Morelli et al., "Carrier-Frequency Estimation for Transmissions Over Selective Channels," IEEE Transactions on Communications, vol. 48, No. 9, pp. 1580-1589, Sep. 2000.

Magnus Sandell et al., "A Comparative Study of Pilot-Based Channel Estimators for Wireless OFDM," pp. 5-34, Sep. 1996.

Martin V. Clark, "Adaptive Frequency-Domain Equalization and Diversity Combining for Broadband Wireless Communications," IEEE Journal on Selected Areas in Communications, vol. 16, No. 8, pp. 1385-1395, Oct. 1998.

Michail K. Tsatsanis et al., "Equalization of Rapidly Fading Channels: Self-Recovering Methods," IEEE Transactions on Communications, vol. 44, No. 5, pp. 619-630, May 1996.

Michail K. Tsatsanis et al., "Modelling and Equalization of Rapidly Fading Channels," International Journal of Adaptive Control and Signal Processing, vol. 10, pp. 159-176, May 1996.

Michail K. Tsatsanis et al., "Pilot Symbol Assisted Modulation in Frequency Selective Fading Wireless Channels," IEEE Transactions on Signal Processing, vol. 48, No. 8, pp. 2353-2365, Aug. 2000.

Naofal Al-Dhahir, "Single-Carrier Frequency-Domain Equalization for Space-Time Block-Coded Transmissions Over Frequency-Selective Fading Channels," IEEE Communications Letters, vol. 5, No. 7, pp. 304-306, Jul. 2001.

Oussama Damen et al., "Lattice Code Decoder for Space-Time Codes," IEEE Communication Letters, vol. 4, No. 5, pp. 161-163, May 2000.

Naofal Al-Dhahir et al., "Block Transmission Over Dispersive Channels: Transmit Filter Optimization and Realization, and MMSE-DFE Receiver Performance," IEEE Transactions Information Theory, vol. 42, No. 1, pp. 137-160, Jan. 1996.

Peter Hoeher et al., "Channel Estimation with Superimposed Pilot Sequence," in Procedure GLOBECOM Conference, Brazil, pp. 1-5, Dec. 1999.

Peter Hoeher et al., "Two-Dimensional Pilot-Symbol-Aided Channel Estimation by Wiener Filtering," Procedures of International Conference on Acoustics, Speech and Signal Processing, Munich, Germany, vol. 3, pp. 1845-1848, Apr. 1997.

Paul H. Moose, "A Technique for Orthogonal Frequency Division Multiplexing Frequency Offset Correction," IEEE Transactions on Communications, vol. 42, No. 10, pp. 2908-1314, Oct. 1994.

Peter Schramm, "Analysis and Optimization of Pilot-Channel-Assisted BPSK for DS-CDMA Systems," IEEE Transactions Communications, vol. 46, No. 9, pp. 1122-1124, Sep. 1998.

Peter Schramm et al., "Pilot Symbol Assisted BPSK on Rayleigh Fading Channels with Diversity: Performance Analysis and Parameter Optimization," IEEE Transactions on Communications, vol. 46, No. 12, pp. 1560-1563, Dec. 1998.

Qinfang Sun et al., "Estimation of Continuous Flat Fading MIMO Channel," IEEE Transactions on Wireless Communications, vol. 1, No. 4, pp. 549-553, Oct. 2002.

Rohit Negi et al., "Pilot Tone Selection for Channel Estimation in a Mobile OFDM System," IEEE Transactions on Consumer Electronics, vol. 44, No. 3, pp. 1122-1128, Aug. 1998.

Robert Molten Gray, "On the Asymptotic Eigenvalue Distribution of Toeplitz Matrices," IEEE Transactions on Information Theory, vol. IT-18, No. 6, pp. 725-730, Nov. 1972.

Srihari Adireddy et al, "Optimal Placement of Training for Frequency-Selective Block-Fading Channels," IEEE Transactions on Information Theory, vol. 48, No. 8, pp. 2338-2353, Aug. 2002.

Srihari Adireddy et al., "Detection With Embedded Known Symbols: Optimal Symbol Placement and Equalization," in Procedures of International Conference ASSP, vol. 5, Istanbul, Turkey, pp. 2541-2544, Jun. 2000.

Stephan Baro et al., "Improved Codes for Space-Time Trellis Coded Modulation," IEEE Communication Letters, vol. 4, pp. 1-3, Jan. 2000.

Sergio Benedetto et al., "Principles of Digital Transmission with Wireless Applications," Kluwer Academic/Plenum Publishers, 1 pg., 1999.

Srikrishna Bhashyam et al., "Time-Selective Signaling and Reception for Communication Over Multipath Fading Channels," IEEE Transactions on Communications, vol. 48, No. 1, pp. 1-34, Jan. 2000.

Stefan A. Fechtel et al., "Optimal Parametric Feedforward Estimation of Frequency-Selective Fading Radio Channels," IEEE Transactions on Communications, vol. 42, No. 2/3/4, pp. 1639-1650, Feb./Mar./Apr., 1994.

S.N. Diggavi et al., "Differential Space-Time Coding for Frequency-Selective Channels," Procedures of 36$^{th}$ Conference on Information Sciences and Systems, pp. 1-8, Princeton University, NJ, Mar. 20-22, 2002.

Shuichi Ohno et al., "Average-Rate Optimal PSAM Transmissions Over Time-Selective Fading Channels," IEEE Transactions on Wireless Communications, pp. 374-378, Oct. 2002.

Shuichi Ohno et al., "Capacity Maximizing MMSE-Optimal Pilots for Wireless OFDM Over Frequency-Selective Block Rayleigh-Fading Channels," IEEE Transactions on Information Theory, pp. 2138-2145, vol. 50, No. 9, Sep. 2004.

Shuichi Ohno et al., "Optimal Training and Redundant Precoding for Block Transmissions With Application to Wireless OFDM," IEEE Transactions on Communications, vol. 50, No. 12, pp. 2113-2123, Dec. 2002.

Shengli Zhou et al., "Space-Time Coding With Maximum Diversity Gains Over Frequency-Selective Fading Channels," IEEE Signal Processing Letters, vol. 8, No. 10, pp. 269-272, Oct. 2001.

Shengli Zhou et al., "Subspace-Based (Semi-) Blind Channel Estimation for Block Precoded Space-Time OFDM," IEEE Transactions on Signal Processing, vol. 50, No. 5, pp. 1215-1228, May 2002.

Siavash M. Alamouti, "A Simple Transmit Diversity Technique for Wireless Communications," IEEE Journal on Select Areas in Communications, vol. 16, No. 8, pp. 1451-1458, Oct. 1998.

Thomas Kailath, "Measurements on Time-Variant Communication Channels," IEEE Transactions on Information Theory, vol. IT-8, pp. S229-S236, Sep. 1962.

Thomas Keller et al., "Adaptive Multicarrier Modulation: A Convenient Framework for Time-Frequency Processing in Wireless Communications," IEEE Procedings of the IEEE, vol. 88, No. 5, pp. 611-640, May 2000.

Thomas L. Marzetta and Bertrand M. Hochwald, "Capacity of a Mobile Multiple-Antenna Communication Link in Rayleigh Flat Fading," IEEE Transactions on Information Theory, vol. 45, pp. 1-38, Jan. 1999.

Tai-Lai Tung et al., "Channel Estimation and Adaptive Power Allocation for Performance and Capacity Improvement of Multiple-Antenna OFDM Systems," Third IEEE Signal Processing Workshop on Signal Processing Advances in Wireless Communications, Taoyuan, Taiwan, pp. 82-85, Mar. 20-23, 2001.

Thomas P. Holden et al., "A Spread-Spectrum Based Synchronization Technique for Digital Broadcast Systems," IEEE Transactions on Broadcasting, vol. 36, No. 3, pp. 185-194, Sep. 1990.

Ufuk Tureli et al., "OFDM Blind Carrier Offset Estimation: ESPIRIT," IEEE Transactions on Communications, vol. 48, No. 9, pp. 1459-1461, Sep. 2000.

Vahid Tarokh et al., "Space-Time Block Codes from Orthogonal Designs," IEEE Transactions on Information Theory, vol. 45, No. 5, pp. 1456-1467, Jul. 1999.

Vahid Tarokh et al., "Space-Time Codes for High Data Rate Wireless Communication: Performance Criterion and Code Construction," IEEE Transactions on Information Theory, vol. 44, No. 2, pp. 744-765, Mar. 1998.

Werner Kozek, "On the Transfer Functiun Calculus for Underspread LTV Channels," IEEE Transactions on Signal Processing, vol. 45, No. 1, pp. 219-223, Jan. 1997.

Wen-Yi Kuo et al., "Frequency Offset Compensation of Pilot Symbol Assisted Modulation in Frequency Flat Fading," IEEE Transactions on Communications, vol. 45, No. 11, pp. 1412-1416, Nov. 1997.

Won-Joon Choi et al., "Multiple Input/Multiple Output (MIMO) Equalization for Space-Time Block Coding," IEEE Pacific Rim Conference on Communications, Computers and Signal Processing, pp. 341-344, 1999.

Won-Joon Choi et al., "Space-Time Block Codes Over Frequency Selective Rayleigh Fading Channels," IEEE VTC, vol. 5, pp. 2541-2545, 1999.

Xavier Giraud et al., "Algebraic Tools to Build Modulation Schemes for Fading Channels," IEEE Transactions on Information Theory, vol. 43, No. 3, pp. 938-952, May 1997.

Xiaodong Wang et al., "Iterative (Turbo) Soft Interference Cancellation and Decoding for Coded CDMA," IEEE Transactions on Communications, vol. 47, No. 7, pp. 1046-1061, Jul. 1999.

Xiaoli Ma et al., "Maximum Diversity Transmissions Over Doubly Selective Wireless Channels," IEEE Transactions on Information Theory, vol. 49, No. 7, pp. 1832-1840, Jul. 2003.

Xiaoli Ma et al., "Optimal Training for Block Transmissions Over Doubly Selective Wireless Fading Channels," IEEE Transactions on Signal Processing, vol. 51, No. 5, pp. 1351-1366, May 2003.

Xiaoli Ma et al., "Non-Data-Aided Carrier Offset Estimators for OFDM With Null Subcarriers: Identifiability, Algorithms, and Performance," IEEE Journal on Selected Areas in Communications, vol. 19, No. 12, pp. 2504-2515, Dec. 2001.

Xiaoli Ma et al., "Optimal Training for MIMO Frequency-Selective Fading Channels," IEEE Transactions on Wireless Communications, pp. 1-14.

Ye (Geoffrey) Li et al., "Transmitter Diversity for OFDM Systems and Its Impact on High-Rate Data Wireless Networks," IEEE Journal on Selected Areas in Communications, vol. 17, No. 7, pp. 1233-1243, Jul. 1999.

Ye (Geoffrey) Li, "Simplified Channel Estimation for OFDM Systems With Multiple Transmit Antennas," IEEE Transactions on Wireless Communications, vol. 1, No. 1, pp. 67-75, Jan. 2002.

Ye (Geoffrey) Li, Nambirajan Seshadri, and Sirikiat Ariyavisitakul, "Channel Estimation for OFDM Systems with Transmitter Diversity in Mobile Wireless Channels," IEEE Journal on Selected Areas in Communications, vol. 17, No. 3, pp. 461-471, Mar. 1999.

Youjian Liu et al., "Space-Time Codes Performance Criteria and Design for Frequency Selective Fading Channels," Procedures of International Conference on Communication, pp. 1-5.

Yuan-Pei Lin et al., "Block Based DMT Systems With Reduced Redundancy," Procedures of International Conference on ASSP, Salt Lake City, UT, pp. 2357-2360, May 2001.

Yan Xin et al., "Linear Unitary Precoders for Maximum Diversity Gains with Multiple Transmit and Receive Antennas," Procedure of 34$^{th}$ Asilomar Conference on Signals, Systems, and Computers, pp. 1553-1557, Pacific Grove, CA, Oct. 29-Nov. 1, 2000.

Yuze Zhang et al., "A Performance Analysis and Design of Equalization with Pilot Aided Channel Estimation," Procedures of the 47$^{th}$ Vehicular Technology Conference, vol. 2, pp. 720-724, 1997.

Yuze Zhang et al., "Soft Output Demodulation on Frequency-Selective Rayleigh Fading Channels Using AR Channel Models," Procedures of Global Communications Conference, vol. 1, pp. 327-331, 1997.

Zhiqiang Liu et al., "Space-Time Block-Coded Multiple Access Through Frequency-Selective Fading Channels," IEEE Transactions on Communications, vol. 49, No. 6, pp. 1033-1044, Jun. 2001.

Zhiqiang Liu, et al., "Space-Time Coding for Broadband Wireless Communications," Wireless Communication Mobile Computers, vol. 1, No. 1, pp. 33-53, Jan.-Mar. 2001.

Zhiqiang Liu et al., "Transmit-Antennae Space-Time Block Coding for Generalized OFDM in the Presence of Unknown Multipath," IEEE Journal on Selected Areas in Communications, vol. 19, No. 7, pp. 1352-1364, Jul. 2001.

Zhiqiang Liu et al., "Linear Constellation Precoding for OFDM with Maximum Multipath Diversity and Coding Gains," IEEE Transactions on Communications, vol. 51, No. 3, pp. 416-427, Mar. 2003.

Zhiqiang Liu et al., Space-Time-Frequency Coded OFDM Over Frequency-Selective Fading Channels, IEEE Transactions on Signal Processing, vol. 50, No. 10, pp. 2465-2476, Oct. 2002.

Zhiqiang Liu et al., "Space-Time Coding With Transmit Antennas for Multiple Access Regardless of Frequency-Selective Multipath," Procedures of Sensor Arry and Multichannel Signal Processing Workshop, pp. 178-182, Mar. 2000.

Zhengdao Wang et al., "Wireless Multicarrier Communications: Where Fourier Meets Shannon," IEEE Signal Processing Magazine, vol. 17, pp. 29-48, May 2000.

Zhengdao Wang et al., "Linearly Precoded or Coded OFDM Against Wireless Channel Fades?," Third IEEE Signal Processing Workshop on Signal Processing Advances in Wireless Communications, Taoyuan, Taiwan, pp. 1-4, Mar. 20-23, 2001.

Zhengdao Wang et al., "Optimality of Single-Carrier Zero-Padded Block Transmissions," Procedures of Wireless Communications and Networking Conference, vol. 2, pp. 660-664, 2002.

Caire et al., "Bit-Interleaved Coded Modulation," IEEE Transactions on Information Theory, vol. 44, No. 3, pp. 927-946, May 1998.

Courville et al., "Blind Equalization of OFDM Systems based on the Minimization of a Quadratic Criterion," Proc. of ICC, Dallas, USA, vol. 3, pp. 1318-1321, Jun. 1996.

Frenger et al., "Decision-Directed Coherent Detection in Multicarrier Systems on Rayleigh Fading Channels," IEEE Trans. on Vehicular Tech., vol. 48, No. 2, pp. 490-498, Mar. 1999.

Heath, Jr. et al., "Exploiting Input Cyclostationarity for Blind Channel Identification in OFDM Systems," IEEE Transactions on Signal Processing, vol. 47, No. 3, pp. 848-856, Mar. 1999.

Mignone et al., "CD3-OFDM: A Novel Demodulation Scheme for Fixed and Mobile Receivers," IEEE Transactions on Communications, vol. 44, No. 9, pp. 1144-1151, Sep. 1996.

Muquet et al., "A Subspace Based Blind and Semi-Blind Channel Identification Method for OFDM Systems," Proc. of IEEE-SP Workshop on Signal Proc. Advances in Wireless Comm., Annapolis, MD, pp. 170-173, May 9-12, 1999.

Muquet et al., "OFDM with Trailing Zeros Versus OFDM with Cyclic Prefix: Links, Comparisons and Application to the Hiperlan/2 Systems," Proc. of Intl. Conf. on Com., New Orleans, pp. 1049-1053, Jun. 2000.

Ruiz et al., "Discrete Multiple Tone Modulation with Coset Coding for the Spectrally Shaped Channel," IEEE Transactions on Communications, vol. 4, No. 6, pp. 1012-1029, Jun. 1992.

Tufvesson et al. "Pilot Assisted Channel Estimation for OFDM in Mobile Cellular Systems," Proc. of the Vehicular Technology Conf., Phoenix, USA, vol. 3, pp. 1639-1643, May 1997.

van de Beek et al., "On Channel Estimation in OFDM Systems," Proc. of the Vehicular Technology Conf., Chicago, USA, vol. 2, pp. 815-819, Jul. 1995.

van Nee et al., "New High-Rate Wireless LAN Standards," IEEE Communications Magazine, vol. 37, No. 12, pp. 82-88, Dec. 1999.

Zhou et al., "Long Codes for Generalized FH-OFDMA Through Unknown Multipath Channels," IEEE Transactions on Communications, vol. 49, No. 4, pp. 721-733, Feb. 2001.

Zhou et al., "Frequency-Hopped Generalized MC-CDMA for Multipath and Interference Suppression," Proc. of MILCOM Conf., Los Angeles, CA, pp. 937-941, Oct. 22-25, 2000.

* cited by examiner

US 8,064,528 B2

ESTIMATING FREQUENCY-OFFSETS AND MULTI-ANTENNA CHANNELS IN MIMO OFDM SYSTEMS

This application claims priority from U.S. Provisional Application Ser. No. 60/472,297, filed May 21, 2003, the entire content of which is incorporated herein by reference.

STATEMENT REGARDING FEDERALLY SPONSORED RESEARCH OR DEVELOPMENT

This invention was made with Government support under Agency Grant No. 01-05612 awarded by the National Science Foundation and with Government support under Agency Grant No. DAAD19-01-2-011 awarded by the Army Research Lab (ARL/CTA). The Government may have certain rights in the invention.

TECHNICAL FIELD

The invention relates to communication systems and, more particularly, carrier frequency offset estimation and channel estimation in communication systems.

BACKGROUND

Providing reliable high data rate services, e.g. real-time multimedia services, over wireless communication channels is a paramount goal in developing coding and modulation schemes. When a data rate for wireless communication systems is high in relation to bandwidth, multipath propagation may become frequency-selective and cause intersymbol interference (ISI). Multipath fading in wireless communication channels causes performance degradation and constitutes the bottleneck for increasing data rates.

Orthogonal frequency division multiplexing (OFDM) is inherently resistant to multipath fading and has been adopted by many standards because it offers high data-rates and low decoding complexity. For example, OFDM has been adopted as a standard for digital audio broadcasting (DAB) and digital video broadcasting (DVB) in Europe and high-speed digital subscriber lines (DSL) in the United States. OFDM has also been proposed for local area mobile wireless broadband standards including IEEE 802.11a, IEEE 802.11g, MMAC and HIPERLAN/2. Additionally, space-time (ST) multiplexing with multiple antenna arrays at both the transmitter and receiver are effective in mitigating fading and enhancing data rates. Therefore, multi-input multi-output (MIMO) OFDM is attractive for multi-user wireless communication systems. However, MIMO OFDM systems have increasing channel estimation complexity as the number of antennas increases due to the increased number of unknowns which must be estimated and have great sensitivity to carrier frequency offsets (CFO).

Typical single-input single-output (SISO) OFDM systems rely on blocks of training symbols or exploit the presence of null sub-carriers in order to acquire channel state information (CAI) to mitigate CFO and perform channel estimation. In the IEEE 802.11a, IEEE 802.11g, and HIPERLAN/2 standards, sparsely placed pilot symbols are present in every OFDM symbol and pilot symbols are placed in the same positions from block to block. Additionally, channel estimation is performed on a per block basis.

For channel state information (CSI) acquisition, three classes of methods are available: blind methods which estimate CSI solely from the received symbols; differential methods that bypass CSI estimation by differential encoding; and input-output methods which rely on training symbols that are known a priori to the receiver. Relative to training based schemes, differential approaches incur performance loss by design, while blind methods typically require longer data records and entail higher complexity. Although training methods can be suboptimal and are bandwidth consuming, training methods remain attractive in practice because they decouple symbol detection from channel estimation, thereby simplifying receiver complexity and relaxing the required identifiability conditions.

SUMMARY

In general, the invention is directed to techniques for carrier frequency offset (CFO) and channel estimation of orthogonal frequency division multiplexing (OFDM) transmissions over multiple-input multiple-output (MIMO) frequency-selective fading channels. In particular, techniques are described that utilize training symbols such that CFO and channel estimation are decoupled from symbol detection at the receiver. Unlike conventional systems in which training symbols are inserted within a block of space-time encoded information-bearing symbols to form a transmission block, the techniques described herein insert training symbols over two or more transmission blocks. Furthermore, training symbols may include both non-zero symbols and zero symbols and are inserted so that channel estimation and CFO estimation are performed separately. Zero symbols, referred to as null subcarriers, are utilized that change position, i.e. "hop", from block to block. In this manner, the information-bearing symbols and training symbols are received in a format in which the training symbols are easily separated from the information-bearing symbols, thereby enabling CFO estimation to be performed prior to channel estimation.

In one embodiment, the invention is directed to a method comprising forming blocks of symbols by inserting training symbols within two or more blocks of information-bearing symbols; applying a hopping code to each of the blocks of symbols to insert a null subcarrier at a different position within each of the blocks of symbols; and outputting wireless transmission signal in accordance with the blocks of symbols.

In another embodiment, the invention is directed to a method comprising receiving a wireless signal transmitted from a stream of blocks of symbols, wherein each block of symbols includes one or more information-bearing symbols, one or more training symbols, and at least one null subcarrier at a different position within each of the blocks of symbols. The method further comprises outputting estimated symbols based on the received wireless signal.

In another embodiment, the invention is directed to a wireless communication device comprising a training symbol insertion module to form blocks of symbols by inserting training symbols within two or more blocks of information-bearing symbols, wherein the training symbol insertion module applies a hopping code to each of the blocks of symbols to insert a null subcarrier at a different position within each of the blocks of symbols; and a modulator to output a wireless transmission signal in accordance with the blocks of symbols.

In another embodiment, the invention is directed to a wireless communication device comprising: one or more antennas that receive a wireless signal transmitted from a stream of blocks of symbols, wherein each block of symbols includes one or more information-bearing symbols, one or more training symbols, and at least one null subcarrier at a different position within each of the blocks of symbols; an carrier frequency offset estimator to estimate a carrier frequency offset of the received signal based on the positions of the null subcarriers; and a decoder to output a stream of estimated symbols based on the received wireless signal and the estimated carrier frequency offset.

In another embodiment, the invention is directed to a computer-readable medium containing instructions. The instructions cause a programmable processor to form blocks of symbols by inserting training symbols within two or more blocks of information-bearing symbols; apply a hopping code to each of the blocks of symbols to insert a null subcarrier at a different position within each of the blocks of symbols; and output wireless transmission signal in accordance with the blocks of symbols.

The described techniques may offer one or more advantages. For example, instead of performing CFO and MIMO channel estimation on a per block basis, several transmission blocks are collected by a receiver for estimating CFO and the MIMO frequency-selective channels, thereby resulting in an efficient use of bandwidth. Further, because the training symbols are inserted in a manner that decouples CFO and channel estimation from symbol detection, low-complexity CFO and channel estimation can be performed. Moreover, the described techniques allow for full acquisition range of the CFO estimator and identifiability of the MIMO channel estimator.

Other advantages of performing block equalization may include improved bit-error-rate (BER) performance relative to typical techniques and flexibility to adjust the number of blocks collected to perform channel estimation. Because of the improved BER performance, less expensive voltage controlled oscillators may be used. Additionally, the training patterns of the described techniques can easily be implemented by current OFDM standards, such as IEEE 802.11a and IEEE 802.11g.

The details of one or more embodiments of the invention are set forth in the accompanying drawings and the description below. Other features, objects, and advantages of the invention will be apparent from the description and drawings, and from the claims.

DETAILED DESCRIPTION

Throughout the Detailed Description bold upper letters denote matrices, bold lower letters stand for column vectors, $(\bullet)^T$ and $(\bullet)^H$ denote transpose and Hermitian transpose, respectively; $(\bullet)^*$ denotes conjugate and $\lceil \bullet \rceil$ denotes the nearest integer. $E[\bullet]$ stands for expectation and $\mathrm{diag}[x]$ stands for a diagonal matrix with x on its main diagonal; matrix $D_N(h)$ with a vector argument denotes an N×N diagonal matrix with $D_N(h)=\mathrm{diag}[h]$. For a vector, $\|\bullet\|$ denotes the Euclidian norm. $[A]_{k,m}$ denotes the (k, m)th entry of a matrix A, and $[x]_m$ denotes the mth entry of the column vector x; $I_N$ denotes the N×N identity matrix; $e_i$ denotes the (i+1)st column of $I_N$; $[F_N]_{m,n}=N^{(1/2)}\exp(-j2\Pi mn/N)$ denotes the N×N fast fourier transform (FFT) matrix; and we define $f:=[1, \exp(j\omega), \exp(j(N-1)\omega)]^T$.

Figure 1:
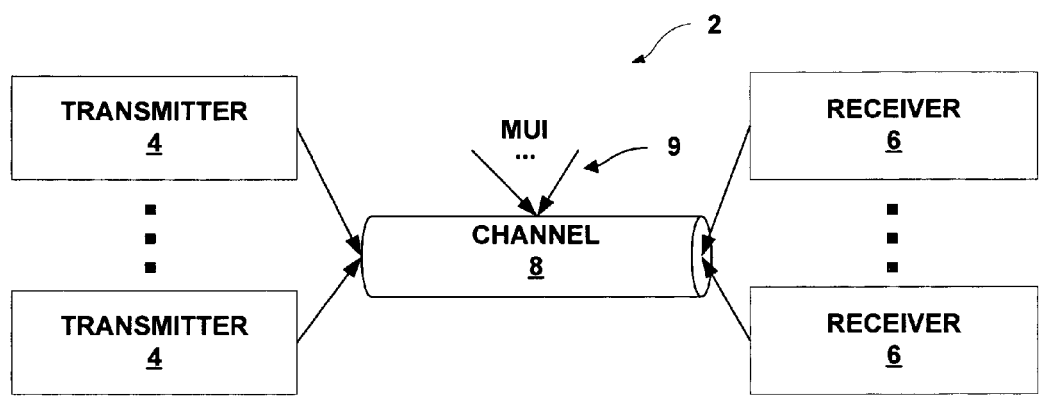
FIG. 1 is a block diagram illustrating an exemplary wireless multi-user communication system in which multiple transmitters communicate with multiple receivers through a wireless communication channel.

FIG. 1 is a block diagram illustrating a multi-user wireless communication system 2 in which multiple transmitters communicate with multiple receivers 6 through wireless communication channel 8. In general, the invention describes techniques for performing carrier frequency offset (CFO) and channel estimation of orthogonal frequency division multiplexing (OFDM) transmissions output by transmitters 4 over multiple-input multiple-output (MIMO) frequency-selective fading channel 8. As described herein, the techniques maintain orthogonality among subcarriers of OFDM transmissions through channel 8 allowing low-complexity receivers 6 and full acquisition range of the CFO.

Transmitters 4 output a transmission signal in accordance with a block of symbols in which two or more training symbols are inserted and in which a hopping code is applied. A block of training symbols including two or more training symbols may be inserted within a block of space-time encoded information-bearing symbols. A hopping code may then be applied to the resulting block of symbols to insert a null subcarrier, i.e. zero symbol, within the block symbols such that the null subcarrier changes position, i.e. "hops", from block to block. Unlike conventional systems in which training symbols are inserted within a single transmission block, the techniques described herein insert training symbols over two or more transmission blocks. Consequently, transmitters 4 may insert a sequence of training symbols over two or more transmission blocks, thereby increasing bandwidth efficiency because smaller blocks of training symbols may be used. Receivers 6 may then collect the training symbols inserted within the two or more transmission blocks in order to perform channel estimation. Furthermore, the information-bearing symbols and training symbols are received through communication channel 8 by receivers 6 in a format in which the training symbols are easily separated from the information-bearing symbols, thereby enabling CFO estimation to be performed prior to channel estimation. As a result, the techniques described herein may have improved bit-error-rate (BER) performance over conventional alternatives.

The described techniques can work with any space-time encoded transmission and is backwards compatible with OFDM which has been adopted as a standard for digital audio broadcasting (DAB) and digital video broadcasting (DVB) in Europe and high-speed digital subscriber lines (DSL) in the United States. OFDM has also been proposed for local area mobile wireless broadband standards including IEEE 802.11a, IEEE 802.11g, MMAC and HIPERLAN/2.

The techniques described herein apply to uplink and downlink transmissions, i.e., transmissions from a base station to a mobile device and vice versa. Transmitters 4 and receivers 6 may be any device configured to communicate using a multi-user wireless transmission including a cellular distribution station, a hub for a wireless local area network, a cellular phone, a laptop or handheld computing device, a personal digital assistant (PDA), a Bluetooth™ enabled device, and other devices.

Figure 2:
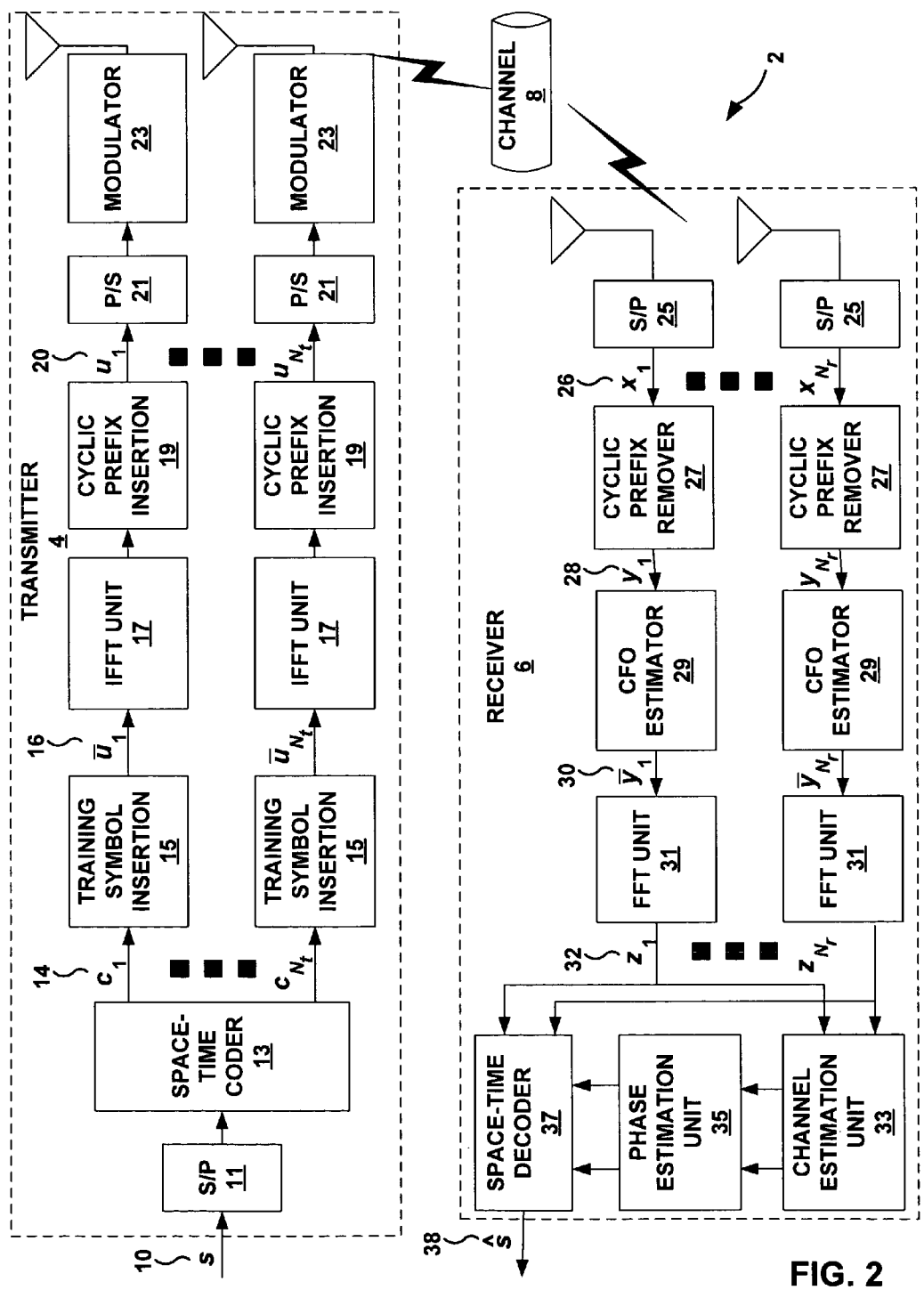
FIG. 2 is a block diagram illustrating in further detail one embodiment of a transmitter and a receiver within the multi-user communication system of FIG. 1.

FIG. 2 is a block diagram illustrating in further detail the multi-user communication system of FIG. 1. In particular, FIG. 2 illustrates exemplary embodiments of multi-antenna transmitter 4 and multi-antenna receiver 6 communicating over MIMO frequency-selective channel 8 in the presence of a CFO. Multi-antenna transmitter 4 and multi-antenna receiver 6 have $N_t$ and $N_r$ antennas, respectively. While OFDM transmissions are inherently resilient to multipath fading, OFDM transmissions are more sensitive to frequency offsets than single carrier systems. Frequency offsets can occur when a voltage controlled oscillator (VCO) of receiver 6 is not oscillating at exactly the same carrier frequency as a VCO of transmitter 4 and can also occur as a result of the Doppler effect. When the frequency offset is permanent, it is typically referred to as a carrier frequency offset and when the frequency offset varies over time, it is typically referred to as phase noise. Frequency offsets cause a degradation in BER performance because the orthogonality among subcarriers is destroyed and the subcarriers can interfere with each other.

Generally, receiver 6 corresponds to a particular user performing CFO and channel estimation of OFDM transmissions output by transmitter 4 through MIMO frequency-selective fading channel 8 in the presence of a CFO. Each information-bearing symbol s(n) 10 is selected from a finite alphabet and input into serial to parallel converter (S/P) 11 which parses $N_s$ information-bearing symbols from a serial stream of information-bearing symbols into blocks of information-bearing symbols. The nth entry of the kth block of the block of information-bearing symbols is denoted $[s(k)]_n$=s($kN_s$+n). Space-Time coder 13 encodes and/or multiplexes each block s(k) in space and time to yield blocks $\{c_\mu(k)\}_{\mu=1}^{N_t}$ 14 of length $N_c$. Space-Time coder 13 may apply any space-time code to yield blocks $\{c_\mu(k)\}_{\mu=1}^{n_t}$ for each respective transmit antenna of multi-antenna transmitter 4.

Each of training symbol insertion units 15 inserts two or more training symbols, which may have non-zero or zero values, within space-time encoded blocks $\{c_\mu(k)\}_{\mu=1}^{N_t}$ 14 and applies a hopping code to blocks $\{c_\mu(k)\}_{\mu=1}^{N_t}$ 14 to form a vectors $\bar{u}_\mu(k)$ 16 with length N for the μth antenna of multi-antenna transmitter 4. Applying the hopping code inserts a null subcarrier which changes position, i.e. "hops", from block to block. Each subcarrier corresponding to a zero symbol is referred to as a null subcarrier. Unlike conventional systems in which training symbols are inserted within a single transmission block, each of training symbol insertion units 15 may insert training symbols over two or more blocks. Consequently, transmitter 4 may insert a sequence of training symbols over two or more blocks $\{c_\mu(k)\}_{\mu=1}^{N_t}$ 14. Sparsely inserting training symbols increases the bandwidth efficiency of communication system 2 because fewer training symbols may be inserted per block $\{c_\mu(k)\}_{\mu=1}^{N_t}$ 14. In some embodiments, each of training symbol insertion units 15 may insert a particular number of training symbols per block $\{c_\mu(k)\}_{\mu=1}^{N_t}$ 14 based on channel 8's coherence time and the pertinent burst duration, e.g. if the burst is long fewer training symbols may be inserted per block $\{c_\mu(k)\}_{\mu=1}^{N_t}$ 14. Furthermore, training symbols may be inserted in accordance with existing OFDM standards such as IEEE 802.11a and IEEE 802.11g. Training symbol insertion units 15 are described in greater detail below using notation introduced in the following paragraphs.

Subsequent to the insertion of training symbols, MIMO OFDM is implemented. In particular, each of inverse fast Fourier transform (IFFT) units 17 implement N-point IFFT via left multiplication with $F_N^h$ on each corresponding block $\bar{u}_\mu(k)$ 16 and each of cyclic prefix insertion units 19 insert a cyclic prefix via left multiplication with the appropriate matrix operator $T_{cp}:=[I_{L\times N}^T I_N^T]^T$, where $I_{L\times N}^T$ represents the last L columns of $I_N$. Each of parallel to serial converters (P/S) 21 then parses the resulting blocks $\{u_\mu(k)=T_{cp}F_N^H \bar{u}_\mu(k)\}_{\mu=1}^{N_t}$ of size P×1 into a serial symbol stream. Each of modulators 23 modulate the corresponding P×1 blocks which are transmitted by the $N_t$ transmit antennas over frequency-selective communication channel 8.

Generally, communication channel 8 can be viewed as an $L^{th}$ order frequency-selective channel from the μth transmit antenna of transmitter 4 to the νth receive antenna of receiver 6. Consequently, communication channel 8 can be represented in the discrete-time equivalent form $h^{(v,\mu)}(l), l\in[0, L]$ and incorporates transmit and receive filters, $g_\mu(t)$ and $g_v(t)$ respectively, as well as frequency selective multipath $g_{v,\mu}(t)$, i.e. $h^{(v,\mu)}(l) \triangleq (g_\mu * g_{v,\mu} * g_v(t)|_{t=lT}$, where * denotes convolution and T is the sampling period which may be chosen to be equivalent to the symbol period.

Transmissions over communication channel 8 experience a frequency offset, $f_o$ in Hertz, which may be caused by a mismatch between a voltage controlled oscillator (VCO) of transmitter 4 and a VCO of receiver 6 or may also be caused by the Doppler effect. In the presence of a frequency offset, the samples at νth receive antenna can be represented according to equation (1) below, where $\omega_o:=2\Pi f_o T$ is the normalized CFO, $N_r$ is the number of receive antennas, and $\eta_v(n)$ is zero-mean, white, complex Gaussian distributed noise with variance $\sigma^2$.

$$X_v(n) = \sum_{\mu=1}^{N_t} e^{j\omega_v n} \sum_{l=0}^{L} h^{(v,\mu)}(l) u_\mu(n-1) + \eta_v(n), v \in [1, N_r] \quad (1)$$

Each of serial to parallel converters (S/P) 25 convert a respective received sequence x(n) into a corresponding P×1 block 26 with entries $[x_v(k)]_p := x_v(kP+p)$. By selecting block size P greater than channel order L each received block $x_v(k)$ 26 depends only on two consecutive transmitted blocks, $u_\mu(k)$ and $u_\mu(k-1)$ which is referred to as inter-block interference (IBI). In order to substantially eliminate IBI at receiver 6, each of cyclic prefix removers 27 removes the cyclic prefix of the corresponding blocks $x_v(k)$ 26 by left multiplication with the matrix $R_{cp}:=[0_{N\times L} I_N]$. The resulting IBI-free block can be represented as $y_v(k):=R_{cp}x_v(k)$ 28. Equation (2) below can be used to represent the vector-matrix input-output relationship, where $\eta_v(k):=[\eta_v(kP), \eta_v(kP+1), \ldots, \eta_v(kP+P-1)]^T$, with $P=N+L$; $H^{v,\mu}$ is a P×P lower triangular Toeplitz matrix with first column $[h^{(v,\mu)}(0), \ldots, h^{(v,\mu)}(L), 0, \ldots, 0]^T$; and $D_P(\omega_o)$ is a diagonal matrix defined as $D_P(\omega_o):=\text{diag}[1, e^{j\omega_o}, \ldots, e^{j\omega_o(P-1)}]$.

$$y_v(k) = \sum_{\mu=1}^{N_t} e^{j\omega_v kP} R_{cp} D_P(w_0) H^{(v,\mu)} T_{cp} F_N^H \bar{u}_\mu(k) + R_{cp}\eta_v(k), v \in [1, N_r] \quad (2)$$

Based on the structure of the matrices involved, it can be readily verified that $R_{cp}D_P(w_v)=e^{j\omega_o L}D_N(w_v)R_{cp}$, where $D_N(w_v):=\text{diag}[1, e^{j\omega_o}, \ldots, e^{j\omega_0(P-1)}]$. Following this identity, we define the N×N matrix $\tilde{H}^{(v,\mu)}:=R_{cp}H^{(v,\mu)}T_{cp}$, as a circulant matrix with first column $[h^{(v,\mu)}(0), \ldots, h^{(v,\mu)}(L), 0, \ldots, 0]^T$. Letting also $v_v(k):=R_{cp}\eta_v(k)$, equation (2) can be rewritten according to equation (3).

$$y_v(k) = e^{j\omega_v(kP+L)} D_N(w_0) \sum_{\mu=1}^{N_t} \tilde{H}^{(v,\mu)} F_N^H \bar{u}_\mu(k) + v_v(k), v \in [1, N_r] \quad (3)$$

In the absence of a CFO, taking the FFT of $y_v(k)$ 28 renders the frequency-selective channel 8 equivalent to a set of flat-fading channels, since $F_N^H \tilde{H}^{(v,\mu)} F_N^H$ is a diagonal matrix $D_N(\tilde{h}^{(v,\mu)})$, where $\tilde{h}^{(v,\mu)} := [\tilde{h}^{(v,\mu)}(0), \ldots, \tilde{h}^{(v,\mu)}(2\Pi(N-1)/N)]^T$, with $$\tilde{h}^{(v,\mu)}(2\Pi n/N) := \sum_{l=0}^{L} \tilde{h}^{(v,\mu)}(l)\exp(-j2\pi nl/N)$$

representing the (v, μ)th channel's frequency response vales on the FFT grid. However, in the presence of a CFO, the orthogonality of subcarriers is destroyed and the channel cannot be diagonalized by taking the FFT of $y_v(k)$ 28. In order to simplify the input-output relationship, $F_N^H F_N = I_N$ can be inserted between $D_N(w_o)$ and $\tilde{H}^{(v,\mu)}$ to re-express equation (3) as equation (4).

$$y_v(k) = e^{jw_v(kP+L)} D_N(w_0) \sum_{\mu=1}^{N_t} F_N^H D_N(\tilde{h}^{(v,\mu)}) \bar{u}_\mu(k) + v_v(k), v \in [1, N_r] \quad (4)$$

From equation (4) it can be deduced that estimating the CFO and the multiple channels based on $\{y_v(k)\}_{v=1}^{N_t}$ 28 is a non-linear problem. Given $\{y_v(k)\}_{v=1}^{N_t}$ 28, the CFO $\omega_o$ and the $N_t N_r$ channels $h^{(v,\mu)} := [h^{(v,\mu)}(0), \ldots, h^{(v,\mu)}(L)]^T$ in MIMO OFDM communication system 2 are estimated based on the training symbols inserted by training symbol insertion unit 15.

Although $\bar{u}_\mu(k)$ 16 contains both information-bearing symbols and training symbols, separation of the information-bearing symbols and training symbols is challenging due to the presence of CFO $\omega_o$. Each of training symbol insertion units 15 inserts two or more training symbols within the corresponding information-bearing symbols $c_\mu(k)_{\mu=1}^{N_t}$ 14 so that CFO estimation can be separated from MIMO channel estimation. The insertion of the training symbols is performed in two steps.

In the first step, each of training symbol insertion units 15 inserts a block of training symbols $b_\mu(k)$ into the corresponding block of information bearing symbols $c_\mu(k)_{\mu=1}^{N_t}$ 14 in accordance with equation (5), where the two permutation matrices $P_A$, $P_B$ have sizes $K \times N_c$ and $K \times N_b$ respectively, and are selected to be mutually orthogonal, i.e. $P_A^T P_B = 0_{N_c \times N_b}$.

$$\tilde{u}_\mu(k) = P_A c_\mu(k) + P_B b_\mu(k) \quad (5)$$

It is important to note that $N_c + N_b = K$ and $K < N$. In some embodiments, $P_A$ may be formed with the last $N_c$ columns of $I_{N_c+N_b}$, and $P_B$ with the first $N_b$ columns of $I_{N_c+N_b}$ in accordance with equations (6) and (7), respectively.

$$P_A = [e_{N_b} \ldots e_{K-1}] \quad (6)$$

$$P_A = [e_0 \ldots e_{N_b-1}] \quad (7)$$

Figure 3:
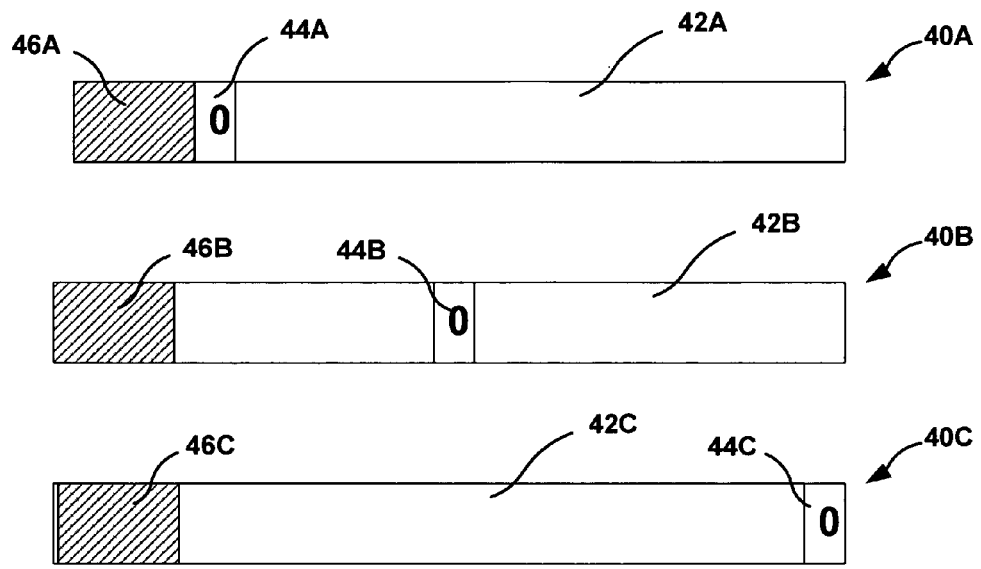
FIG. 3 illustrates example transmission blocks generated by the transmitter of FIG. 2.

The block of training symbols $b_\mu(k)$ may comprise two or more training symbols and has length $N_b$. Moreover, $b_\mu(k)$ may be one block of training symbols in a training sequence including two or more blocks of training symbols. By sparsely inserting the training symbols, bandwidth efficiency of communication system 2 can be increased. The resulting structure of $\tilde{u}_{\mu\ (k)\ in\ equation}$ (5) is illustrated in FIG. 3. The structure of $b_\mu(k)$ is described in greater detail below.

In the second step, N-K zeros are inserted per block $\tilde{u}_\mu(k)$ to obtain $\bar{u}_\mu(k)$. This insertion can be implemented by left-multiplying $\tilde{u}_\mu(k)$ with the hopping code $T_{sc}$ given in equation (8), where $q_k := k[N/(L+1)]$.

$$T_{sc}(k) := [e_{qk}(\bmod N), \ldots, e_{qk+K-2(\bmod N)}] \quad (8)$$

Applying the hopping code given in equation (8) inserts a zero symbol referred to as a null subcarrier in each block $\tilde{u}_\mu(k)$. Dependence of $T_{sc}$ on the block index k implies that the position of the inserted null subcarrier changes from block to block. In other words, equation (8) implements a null subcarrier "hopping" operation from block to block. By substituting equations (8) and (5) into equation (4) it can be deduced that the resulting signal at the with receive antenna takes the form of equation (9) given below.

$$y_v(k) = \sum_{\mu=1}^{N_t} e^{jw_v(kP+L)} D_N(w_v) F_N^H D_N(\tilde{h}_N^{v,\mu}) T_{sc}(k) \tilde{u}_\mu(k) + v_v(k) \quad (9)$$

Therefore, each of training symbol insertion units 15 inserts zero and non-zero training symbols which are used by each of CFO estimators 29 and channel estimation unit 33 to estimate the CFO $\omega_o$ and communication channel 8. The null subcarrier is inserted so that the position of the null subcarrier hops from block to block and enables CFO estimation to be separated from MIMO channel estimation. Consequently, the identifiability of the CFO estimator can be established and the minimum mean square error (MMSE) of the MIMO channel estimator can be achieved.

If CFO $\omega_o$ was absent, i.e. $\omega_o = 0$, then the block of training symbols $b_\mu(k)$ could be separated from the received OFDM transmission signal and by collecting the training blocks of a training sequence, communication channel 8 could be estimated using conventional techniques. However, the CFO destroys the orthogonality among subcarriers of the OFDM transmission signal and the training symbols are mixed with the unknown information-bearing symbols and channels. This motivates acquiring the CFO first, and subsequently estimating the channel.

Each of CFO estimators 29 applies a de-hopping code in accordance with equation (10) on a per block basis.

$$D_N^H(k) = diag\left[1, e^{-j\frac{2\pi}{N}qk}, \ldots, e^{-j\frac{2\pi}{N}qk(N-1)}\right] \quad (9)$$

Because hopping code $T_{sc}$ is a permutation matrix and $D_N(\tilde{h}^{(v,\mu)})$ is a diagonal matrix, it can be verified that $D_N(\tilde{h}^{(v,\mu)}) T_{sc}(k) = T_{sc}(k) D_K(\tilde{h}^{(v,\mu)}(k))$, where $\tilde{h}^{(v,\mu)}$ is formed by permuting the entries of $\tilde{h}^{(v,\mu)}$ as dictated by $T_{sc}(k)$. Using the de-hopping code given in equation (10), the identity given in equation (11) can be established, where $T_{zp} := [I_K 0_{K \times (N-K)}]$ is a zero-padding operator.

$$D_N^H(k) F_N^H T_{sc}(k) = F_N^H T_{zp} \quad (11)$$

By multiplying equation (9) by the de-hopping code and using equation (11), equation (12) is obtained, where $$g_v(k) := \sum_{\mu=1}^{N_t} D_K(\tilde{h}^{(v,\mu)}(k)) \tilde{u}_\mu(k) \text{ and } \bar{v}_v(k) := D_N^H(k) v_v(k).$$

$$\bar{y}_v(k) = D_N^H(k) y_v(k) = e^{j\omega_o(kP+L)} D_N(w_v) F_n^H T_{zp} g(k) + \bar{v}_v(k) \quad (12)$$

Equation (12) shows that after de-hopping, null subcarriers in different blocks are at the same location because $T_{zp}$ does not depend on the block index k.

As a result, the covariance matrix of $\bar{y}_v(k)$ 30 is given according to equation (13) where the noise $\bar{v}_v(k)$ has covariance matrix $\sigma^2 I_N$.

$$R_{\bar{y}v} = D_N(w_o)F_N^H T_{zp}E[g(k)g^H(k)] \cdot T_{zp}^H F_N D_N^H(w_v) + \sigma^2 I_N \quad (13)$$

Assuming that the channels are time invariant over M blocks, and the ensemble correlation matrix $R_{\bar{y}v}$ is replaced by its sample estimate given in equation (14) which is formed by averaging across M blocks, where M>K.

$$\hat{R}_{yv} = \frac{1}{M}\sum_{k=0}^{M-1}\bar{y}_v(k)\bar{y}_v^H(k) \quad (14)$$

The column space of $R_{\bar{y}v}$ has two parts: the signal subspace and the null subspace. In the absence of CFO, if $E[g(k)g^H(k)]$ has full rank, the null space of $R_{\bar{y}v}$ is spanned by the missing columns, i.e. the location of the null subcarriers, of the FFT matrix. However, the presence of CFO introduces a shift in the null space. Consequently, a cost function can be built to measure this CFO-induced phase shift. Representing the candidate CFO as w, this cost function can be written according to equation (15), where $$\sum_{v=1}^{N_r} R_{\bar{y}v} = D_N(w_o)F_N^H T_{zp}\left\{\sum_{v=1}^{N_r}E[g(k)g^H(k)]\right\}T_{zp}F_N D_N(w_o). \quad (15)$$

$$J_V(\omega) := \sum_{k=K}^{N-1} f_N^H\left(\frac{2\pi k}{N}\right)D_N^{-1}(\omega)R_{\bar{y}v}D_N(\omega)f_N\left(\frac{2\pi k}{N}\right)$$

Consequently, if $\omega=\omega_o$, then $D_N(\omega_o-\omega)=I_N$. Next, recall that the matrix $F_N^H T_{zp}$ is orthogonal to $\{f_N(2\Pi n/N)\}_{n=K}^{N-1}$. Therefore, if $\omega=\omega_o$, the cost function $J(\omega_o)$ is zero in the absence of noise. However, for this to be true, $\omega_o$ must be the unique minimum of $J(\omega)$. $\omega_o$ is the unique zero of $$J(\omega) \text{ if } \sum_{v=1}^{N_r}E[g(k)g^H(k)]$$

has full rank as established in Proposition 1 below.

Proposition 1 If $E[b_\mu(k)b_{\mu H}^H(k)]$ is diagonal, $$\sum_{v=1}^{N_r} E[b_\mu(k)b_{\mu H}^H(k)]$$

has full rank, $E[c_\mu(k)c_{\mu H}^H(k)]=0$, and $E[b_{\mu 1}(k)b_{\mu 2}^H(k)]=0$, $\forall \mu 1, \neq \mu 2$, then $$\sum_{v=1}^{N_r} E[g_v(k)g_v^H(k)]$$

has full rank.

Training block $b_\mu(k)$ satisfies the conditions of proposition 1. Using the result of Proposition 1, $$\sum_{v=1}^{N_r} E[g_v(k)g_v^H(k)]$$

has full rank, it follows that $J(\omega) \geq J(\omega_o)$, where the equality holds if and only if $\omega=\omega_o$. Therefore, CFO estimates $\hat{\omega}_o$ can be found by minimizing $J(\omega)$ according to equation (16).

$$w_o = arg_\omega^{min} J_v(\omega) \quad (16)$$

Because of subcarrier hopping, $J(\omega)$ has a unique minimum in $[-\Pi,\Pi)$ regardless of the position of channel nulls. This establishes identifiability of $\hat{\omega}_o$ and shows that the acquisition range of the CFO estimator given in equation (16) is $[-\Pi, \Pi)$, which is the full range.

Based on the CFO estimates produced by equation (16), the terms that depend on $\omega_o$ can be removed from $\{\bar{y}_v(k)\}_{k=0}^{M-1}$ 30 and channel estimation can be performed. In order to derive the MIMO channel estimator, the CFO estimate is temporarily assumed to be perfect, i.e. $\hat{\omega}_o=\omega_o$. After each of CFO estimators 29 remove the CFO related terms from $\bar{y}_v(k)$ 30, each of FFT units 31 take the FFT of the corresponding block $\bar{y}_v(k)$ 30 and removes the null subcarriers by multiplying the corresponding blocks $\bar{y}_v(k)$ 30 with $T_{zp}^T$ to obtain $z_v(k)$ 32 according to equation (17), where $\xi_v(k):=e^{-j\omega_o(kP+L)}T_{zp}^T F_N D_N^{-1}(\hat{\omega}_o)\bar{v}_v(k)$.

$$z_v(k) = e^{-j\omega_o(kP+L)}T_{zp}^T F_N D_N^{-1}(\hat{\omega}_o)\bar{y}_v(k) = \quad (17)$$

$$\sum_{\mu=1}^{N_t} D_K(\tilde{h}^{(v,\mu)}(k))(P_A c_\mu(k) + P_B b_\mu(k)) + \xi_v(k)$$

From the design of $P_A$ and $P_B$ in equations (6) and (7) respectively, it can be inferred that $P_A^T D_K(\tilde{h}^{(v,\mu)}(k))P_B=0$. This allows the training symbols to be separated from the received information-bearing symbols in accordance with equations (18) and (19), where equation (18) represents the received information-bearing symbols and equation (19) represents the received training symbols.

$$z_{v,c}(k) := P_A^T z_v(k) = \sum_{\mu=1}^{N_t} P_A^T D_K(\tilde{h}^{(v,\mu)}(k))P_A c_\mu(k) + \xi_{v,c}(k) \quad (18)$$

$$z_{v,b}(k) := P_B^T z_v(k) = \sum_{\mu=1}^{N_t} P_B^T D_K(\tilde{h}^{(v,\mu)}(k))P_B b_\mu(k) + \xi_{v,b}(k) \quad (19)$$

$\xi_{v,c}(k):=P_A^T\xi_v(k)$ and $+\xi_{v,b}(k):=P_B^T\xi_v(k)$. By the definitions of $P_B$ in equation (6) and the de-hopping code in equation (11), the identity in equation (20) can be formed, where $\tilde{h}_b^{(v,\mu)}$ comprises the first $N_b$ entries of $\tilde{h}^{(v,\mu)}$, the $N_b\times(L+1)$ matrix $F(k)$ comprises the first L+1 columns and $q_k$ related $N_b$ rows of $F_N$, and $h^{(v,\mu)}:=[h^{(v,\mu)}(0), \ldots, h^{(v,\mu)}(L)]^T$.

$$(20) \quad D_K(\tilde{h}^{(v,\mu)}(k))P_B=P_B D_{N_b}(\tilde{h}_b^{(v,\mu)}(k))=P_B diag[F(k)h^{(v,\mu)}]$$

Because $P^T_B P_B = I_{N_b}$, equation (20) can be re-expressed according to equation (21) where $B_\mu(k):=\mathrm{diag}[b_\mu(k)]$.

$$z_{v,b}(k) = \sum_{\mu=1}^{N_t} B_\mu(k)F(k)h^{(v,\mu)} + \xi_{v,b}(k) \quad (21)$$

Note that the length for each block of training symbols, $N_b$, can be smaller than $N_t(L+1)$ by sparsely distributing training symbols across blocks. In some embodiments, $N_t+1$ training symbols are inserted every $N+L$ transmitted symbols resulting in a bandwidth efficiency of $(N-N_t-1)/(N+L)$. Collecting $M$ blocks $z_{v,b}(k)$, the input-output relationship based on training symbols and channels can be expressed according to equation (22), where $h_v$ comprises $\{h^{(v,\mu)}\}_{\mu=1}^{N_t}$, $\bar{\xi}_{v,b}:=[\bar{\xi}_{v,b}^T(0),\ldots,\bar{\xi}_{v,b}^T(M-1)]^T$, and B is given in equation (23). Note that B is the same for all $N_r$ receive antennas $$\bar{z}_{v,b} = Bh_v + \bar{\xi}_{v,b} \quad (22)$$

$$B = \begin{pmatrix} B_1(0)P^T_B F(0) & \Lambda & B_{N_T}(0)P^T_B F(0) \\ M & O & M \\ B_1(M-1)P^T_B F(M-1) & K & B_{N_t}(M-1)P^T_B F(M-1) \end{pmatrix} \quad (23)$$

By collecting $z_{v,b}$'s from all $N_t$ transmit antennas into $\bar{z}_b:=[\bar{z}_{1,b}^T,\ldots,\bar{z}_{N_r,b}^T]^T$, the linear MMSE (LMMSE) channel estimator can be expressed according to equation (24), where $R_h:=E[hh^H]$ with $h:=[h_1^T,\ldots,h_{N_r}^T]^T$ as the channel covariance matrix, and $\sigma^2$ represents the noise variance.

$$\hat{h}_{LMMSE}:=:=(\rho^2 R_h^{-1} + I_{N_r}\otimes (B^H B))^{-1}(I_{N_r}\otimes B^H)\bar{z}_b \quad (24)$$

$R_h$ is typically unknown, thus, $MN_b \geq N_t(L+1)$, and $B^H B$ is selected to have full rank. In some embodiments, channel estimation unit 33 is a least squares (LS) estimator given according to equation (25).

$$\hat{h}_{LS}:=(I_{N_r}\otimes (B^H B))^{-1}(I_{N_r}\otimes B^H)\bar{z}_b \quad (25)$$

If the number of training symbols per block is $N_b = N_t$, a minimum number of $M=L+1$ blocks are required to be collected by receiver 6 in order to guarantee that LS estimation can be performed since $h^{(v,\mu)}$ with $L+1$ entries are estimated at the with receive antenna. In some embodiments, channel estimation unit 33 can be adjusted to collect a variable number of blocks based on the complexity that can be afforded.

The number of $b_\mu(k)$'s satisfying the conditions of Proposition 1 is not unique. For example, $N_b=N_t$ may be selected and the training sequences for different transmit antennas may be designed according to equation (26).

$$b_\mu(k)=[0_{\mu-1_r}^T b 0_{N_r-\mu}^T]^T \quad (26)$$

Further, assume N and M are integer multiples of $L+1$. Because the hopping step size in equation (8) is $N/(L+1)$, $B^H B$ can be designed according to equation (27).

$$B^H B = \begin{bmatrix} \sum_{m=0}^{M-1} F^H(m)B_1^H(m)B_1(m)F(m) & & \\ & O & \\ & & \sum_{m=0}^{M-1} F^H(m)B_{N_t}^H(m)B_{N_t}(m)F(m) \end{bmatrix} = \frac{|b|^2 M}{N} I_{N_t(L+1)} \quad (27)$$

Therefore, the number of blocks N improves channel estimation performance. However, this is true when CFO estimation is perfect. When CFO estimation is imperfect, the contrary is true: fewer blocks should be used because the residual CFO estimation error degrades BER performance when the block index is large.

Thus far, the CFO and $N_tN_r$ channels have been estimated, but a residual CFO referred to as phase noise remains. Phase noise degrades the BER severely as the number of blocks used for channel estimation increases.

Using the CFO offset $\hat{\omega}_o$ produced by each of CFO estimators 29, the received transmission block can be expressed according to equation (28) where $\hat{\omega}_o = \omega_o$ is the phase noise and $\xi_v(k):=e^{-j\omega_o(kP+L)}T_{zp}^T F_N D_N^{-1}(\hat{\omega}_o)\bar{v}_v(k)$.

$$\tilde{y}_v(k)=e^{-j(\omega_o-\hat{\omega}_o)(kP+L)}D_N(\omega_o-\hat{\omega}_o)F_N^H T_{zp} g_v(k)+\xi_v(k) \quad (28)$$

When $\hat{\omega}_o$ is sufficiently accurate, the matrix $D_N(\omega_o-\hat{\omega}_o)$ can be approximated by an identity matrix of the same size. However, the phase term $(\hat{\omega}_o - \omega_o)(kP+L)$ becomes increasingly large as the block index k increases. Without mitigating the phase noise, it degrades not only the performance of channel estimation unit 33, but also the BER performance over time.

In order to enhance the BER performance, phase estimation unit 35 uses the non-zero training symbols in $b_\mu(k)$, which were previously designed to estimate channel 8, to estimate the phase noise per block. For example, assume that for the kth block, the estimated channel is obtained by using the LMMSE channel estimator given in equation (24). Further, also assume that the training sequence is designed as given in equation (26) and that channel estimation is perfect, i.e. $D_N(\omega_o-\hat{\omega}_o)\approx I_N$. As a result, after equalizing channel 8, for the vth receive antenna and the μth entry of $z_{v,b}(k)$ 30, the equivalent input-output relationship is given according to equation (29), where $\phi_v(k):=[z_{v,b}(k)]_\mu/[\hat{h}_b^{(v,\mu)}]_\mu$, and $w_v$ is the equivalent noise term after removing the channel.

$$\phi_v(k)=e^{-j(\omega_o-\hat{\omega}_o)(kP+L)}b+w_v \quad (29)$$

Because $b$, is known the phase $(\hat{\omega}_o-\omega_o)(kP+L)$ can be estimated based on the observations from $N_r$ receive antennas on a per block basis. In order to perform this phase estimation step, additional training symbols do not need to be inserted and the extra complexity is negligible. The performance improvement resulting from phase estimation is illustrated the performance graphs given below.

After CFO estimation, the FFT has been performed, and channel estimation space-time decoder 37 decodes the space-time encoded information-bearing symbols to produce the information-bearing symbol estimates $\hat{s}$ 38.

Although estimation for a single common CFO and MIMO channel has been described in a single-user system involving $N_t$ transmit antennas and $N_r$ receive antennas, communication system 2 is not limited to such systems. Communication system 2, can easily be modified to estimate CFOs and channel in a multi-user downlink scenario where the base station deploys $N_t$ transmit antennas to broadcast OFDM based transmissions to $N_r$ mobile stations each of which is equipped with one or more antennas. In this case, there are $N_r$ distinct CFOs and $N_t N_r$ frequency-selective channels to estimate. However, each mobile station can still apply perform CFO estimation as given in equation (16). In addition, it can be verified that the LS channel estimator given in equation (25) can be separated from CFO estimation to estimate the $N_t$ channel impulse responses in $h_v$, for $v=1, \ldots, N_r$, on a per receive antenna basis.

FIG. 3 illustrates example transmission blocks 40A, 40B, and 40C generated by transmitter 4 of communication system 2. In particular, transmission blocks 40A, 40B, and 40C correspond to consecutive transmission blocks $\bar{u}_\mu(k)$ 16 at the output of one of training symbol insertion units 15 with block index k=0, k=1, and k=2, respectively. Generally, each transmission block 40A-40C includes space-time encoded information bearing symbols 42A-C, null subcarriers 44A-44C, and training symbols 46A-46C, respectively. In particular, training symbol insertion units 15 insert blocks of $N_t+1$ training symbols 46A-46C according to equation (26) as a preamble to space-time encoded blocks of information-bearing symbols 42A-C. In some embodiments, training symbols 46A-46C are inserted every N+L transmitted symbols, where a cyclic prefix of L symbols is inserted by cyclic prefix insertion unit 19, resulting in a bandwidth efficiency of $(N-N_t-1)/(N+L)$. Additionally, the number of training symbols inserted may be adjusted depending on the channel's coherence time and the pertinent burst duration Null subcarriers 44A-44C are inserted within transmission blocks 40A-C, respectively, by applying the hopping code given in equation (8) so that the position of null subcarriers 44A-44C change from block to block. In some embodiments, N-K null subcarriers are inserted with hop-step N/(L+1) in each transmission block 40A-C. Additionally, null subcarriers may be inserted in accordance with conventional OFDM standards such as IEEE 802.11a and IEEE 802.11g resulting in easily implemented, low-complexity systems.

Figure 4:
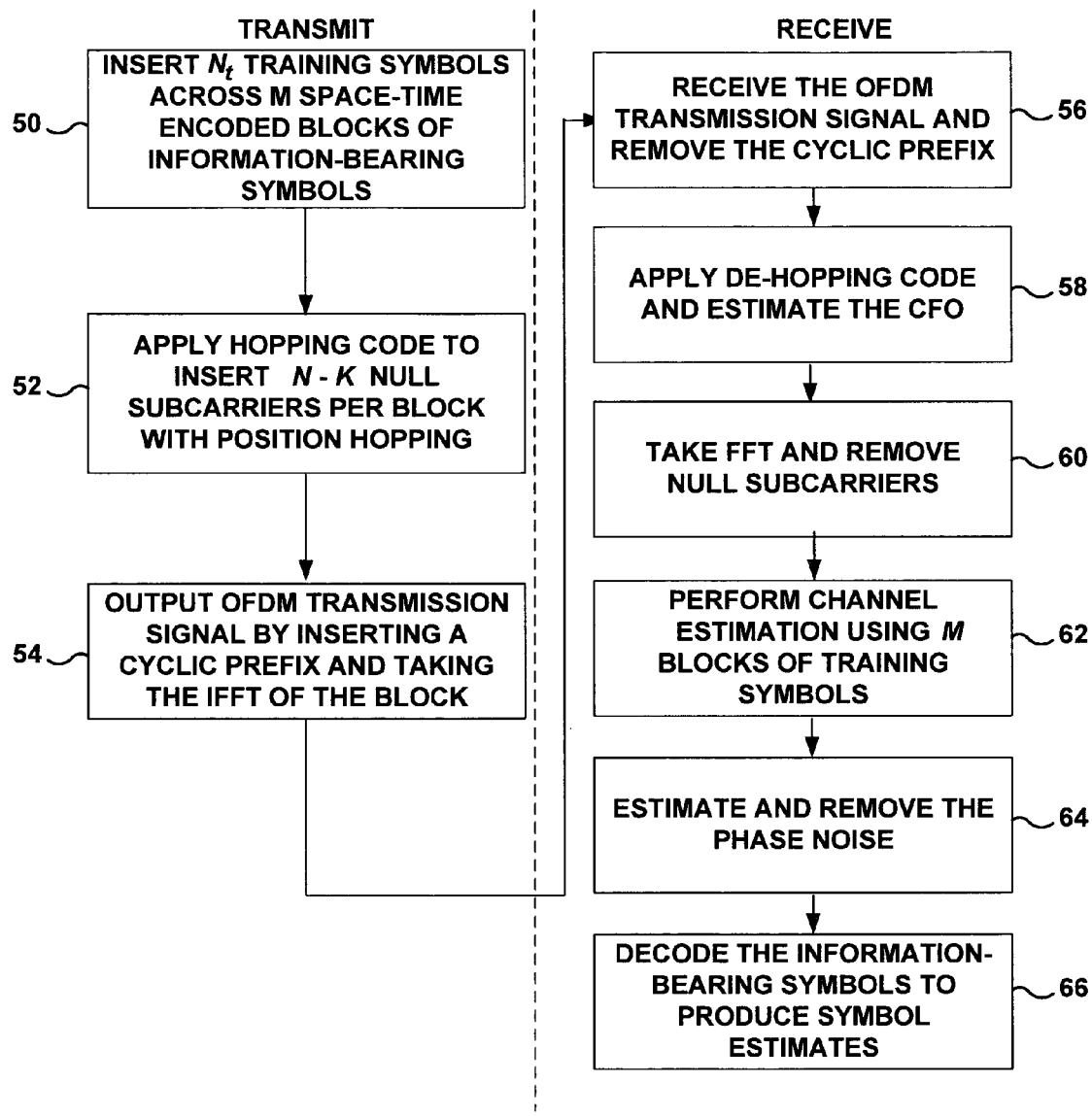
FIG. 4 is a flowchart illustrating an example mode of operation of the communication system of FIG. 2 in which a receiver performs CFO estimation and channel estimation on an OFDM transmission signal output by a transmitter.

FIG. 4 is a flowchart illustrating an example mode of operation of communication system 2 in which receiver 6 performs CFO, channel, and phase noise estimation on an OFDM transmission signal output by transmitter 4. Generally, transmitter 4 inserts $N_t$ training symbols across M space-time encoded blocks of information-bearing symbols (step 50). The training symbols are inserted as a sequence of blocks of training symbols $b_\mu(k)$ as described herein. In some embodiments, the number of training symbols inserted may be adjusted depending on the channel's coherence time and the pertinent burst duration. Additionally, transmitter 4 may insert two or more training symbols per block of space-time encoded information-bearing symbols by applying a first and a second permutation matrix, $P_A$ and $P_B$ respectively, as described previously. After inserting the training symbols, transmitter 4 applies a hopping code to insert N-K null subcarriers per block such that the position of the null subcarriers changes from block to block (step 52). The hopping code may be defined as in equation (8) with hop-step N/(L+1). It may be particularly advantageous to insert null subcarriers in accordance with conventional OFDM standards such as IEEE 802.11a and IEEE 802.11g. Transmitter 4 then outputs an OFDM transmission signal by first inserting a cyclic prefix and taking the IFFT of the resulting block of training and information-bearing symbols (step 54).

Receiver 6 receives the OFDM transmission signal and removes the cyclic prefix (step 56). Receiver 6 then applies a de-hopping code and estimates the CFO (step 58). The de-hopping code rearranges the null subcarriers so that the null subcarriers in different blocks are at the same position in their respective blocks, and the CFO is estimated as described previously. Because of the null subcarrier hopping, the CFO estimation and channel estimation can be separated and the CFO can be estimated over the full acquisition range $[-\Pi, \Pi)$. The FFT is taken and the null subcarriers are removed (step 60) by multiplying $\bar{y}_v(k)$ 30 with zero padding matrix $T_{zp}^T$ to obtain $z_y(k)$ 32. Channel estimation is performed over M blocks of training symbols (step 62). As described previously, each training block length $N_b$ can be smaller than $N_t(L+1)$ by sparsely distributing training symbols across M blocks. In some embodiments, one of a LMMSE channel estimator or a LS channel estimator may be applied to the M blocks to estimate channel 8. In order to improve the BER performance of receiver 6, the phase noise is estimated and removed (step 64) based on the observations from $N_r$ receive antennas on a per block basis. Symbol estimates are then produced by decoding the space-time encoded information-bearing symbols (step 66).

FIGS. 5-12 are graphs that present simulations of OFDM transmissions over MIMO frequency-selective channels using the described techniques for estimating the CFO, channel, and phase noise. In order to benchmark the performance of the techniques described herein, the Crame'r-Rao lower bounds (CRLB) for the CFO are derived. Starting from the model of communication system 2 given in equation (12), the CRLB for $\omega_o$ is given according to equation (30), where $D(k):=\text{diag}[Pk+L, \ldots, P(k+1)-1]$, and $R_{gg}^{(v)}:=E[g_v(k)g_v^H(k)]$.

$$CRLB_\omega = \left( \frac{2}{\sigma_{\bar{v}}^2} \sum_{v=1}^{N_r} \sum_{k=0}^{M-1} tr[D(k) F_N^H T_{zp} R_{gg}^{(v)} F_N D(k)] \right)^{-1} \quad (30)$$

It follows from equation (30) that as the number of blocks increases, the CRLB for CFO decrease. Similarly, the signal-to-noise ratio (SNR) versus CRLB decreases as the number of blocks increases. If N>>N-K, i.e. the number of subcarriers is much greater than the number of null subcarriers, $T_{zp} \approx I_N$. Assuming that $R_{gg}^{(v)} = \epsilon I_N$, where $\epsilon$ represents the average symbol energy, and P, M are sufficiently large equation (31) can be obtained.

$$CRLB_\omega = \frac{\sigma_{\bar{v}}^2}{\epsilon} \frac{3}{2(P-L)P^2 M^3 N_r} \quad (31)$$

Equation (31) explicitly shows that the CRLB of the CFO is independent of the channel and the number of transmit antennas, and that the CRLB of the CFO is inversely proportional to the SNR, the number of receive antennas, and the cube of the number of space-time data.

By assuming that CFO estimation is perfect, the performance of the channel estimator can be derived. If the LMMSE channel estimator given in equation (24) is used, then the mean-square error of the channel estimator is given according to equation (32).

$$\sigma_{lmmse}^2 = tr\left[\left(R_h^{-1} + \frac{M|b|^2}{N\sigma^2} I_{N_t N_r(L+1)}\right)^{-1}\right] \quad (32)$$

Similarly, if the LS channel estimator given in equation (25) is used, the corresponding mean-square error is given by equation (33).

$$\sigma_{ls}^2 = \frac{NN_t N_r(L+1)\sigma^2}{M|b|^2} \quad (33)$$

Equations (32) and (33) both imply that as the number of channels increases, the channel mean square error increases. However, this increase can be mitigated by collecting a greater number of blocks, i.e. more training symbols, provided that the CFO estimate is sufficiently accurate.

In all simulations, HIPERLAN/2 channel model B, given in Table 1, is used to generate the channels. The channel order is L=15 and the taps are independent with different variances. The OFDM block length is designed as N=64 as in HIPERLAN/2. The noise is additive white Gaussian noise with zero-mean and variance $\sigma_n^2$. The SNR is defined SNR=$\epsilon/\sigma_n^2$ and the information-bearing symbols are selected from a quadrature phase-shift keying (QPSK) constellation.

TABLE 1

| tap no. | 0 | 1 | 2 | 3 |
|---|---|---|---|---|
| variance | 2.60e−01 | 2.44e−01 | 2.24e−01 | 7.07e−02 |
| tap no. | 4 | 5 | 6 | 7 |
| variance | 7.93e−02 | 4.78e−02 | 2.95e−02 | 1.78e−02 |
| tap no. | 8 | 9 | 10 | 11 |
| variance | 1.07e−02 | 6.45e−03 | 5.01e−03 | 2.51e−03 |
| tap no. | 12 | 13 | 141 | 15 |
| variance | 0 | 1.48e−03 | 0 | 6.02e−04 |

Figure 5:
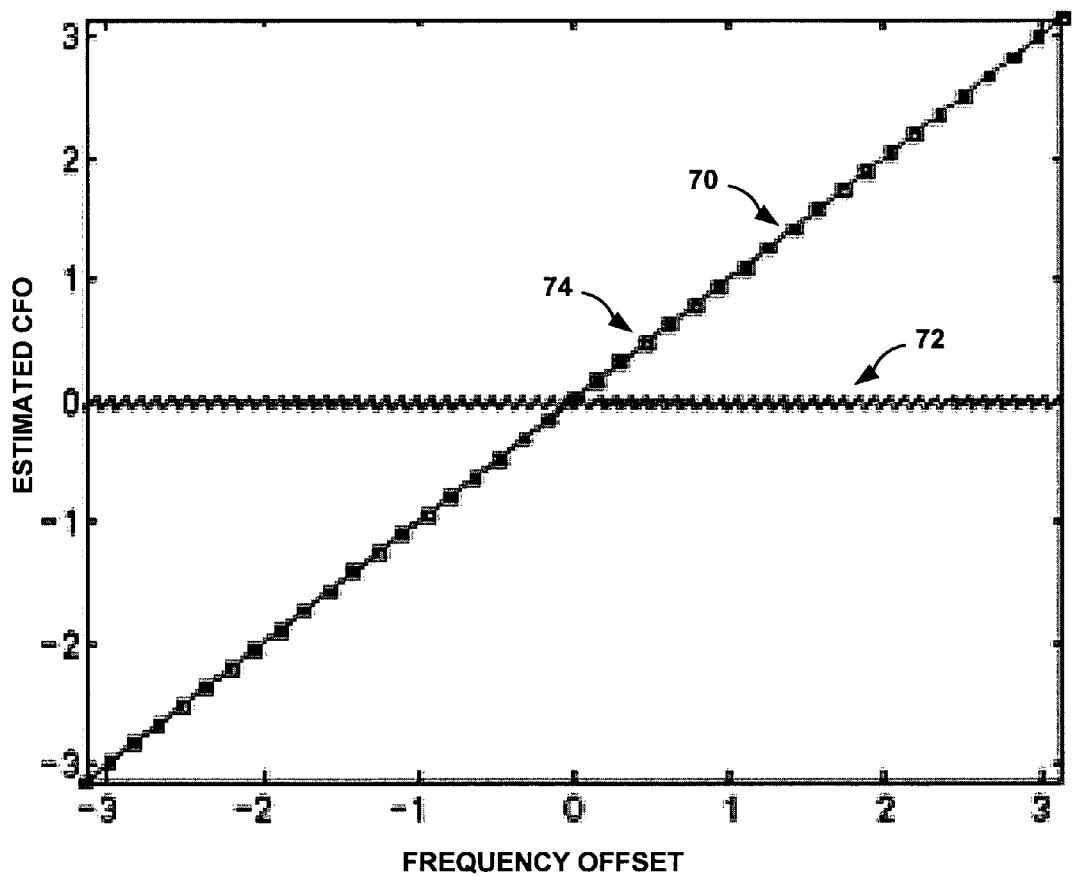
FIGS. 5-12 are graphs illustrating performance estimates of the CFO and channel estimation techniques described herein.

FIG. 5 is a graph comparing the true frequency offset versus the estimated CFO for the CFO estimation techniques described herein (plot 70) and an algorithm described in P. H. Moose, "A technique for orthogonal frequency division multiplexing frequency offset correction," IEEE Transactions on Communications, vol. 42, pp. 2908-1314, October 1994 (plot 72). The ideal line (74) is also shown for comparison and illustrates that the currently described CFO estimation techniques (plot 70) has the full acquisition range [−Π, Π), whereas the algorithm described in the P. H. Mooses reference (plot 72) has an acquisition range proportional to the OFDM block size N.

Figure 6:
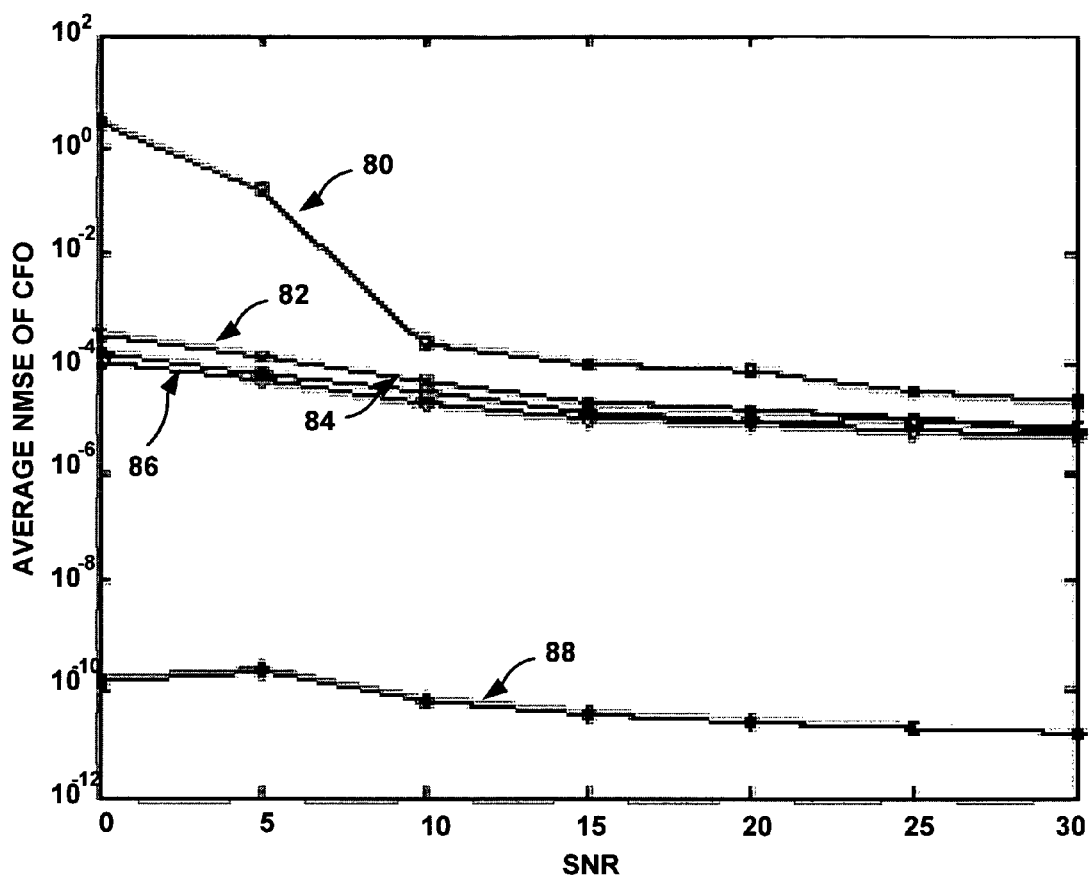

FIG. 6 is a graph comparing the effect of the number of blocks over which channel estimation is performed for the presently described CFO estimation techniques with $N_t$=2 and $N_r$=2. The CFO is ramdomly selected to in the range [−0.5Π, 0.5Π]. In each OFDM transmission block, there are four non-zero training symbols, 4 zero symbols to remove interference from other channels, and one zero symbol serving as a null subcarrier. The placement of the training symbols is in accordance with the techniques herein, and different numbers of blocks are use: M=L+1 (plot 80), M=K (plot 82), 2K (plot 84), 3K (plot 86), and the CRLB derived previously with M=K (plot 88) for comparison. FIG. 6 depicts the CFO normalized mean square error (NMSE), defined as $E[\|\hat{\omega}_o - \omega_o\|^2 / \|\omega_o\|^2]$, verses SNR. As the number of OFDM blocks M increases, the NMSE of CFO decreases. However, the improvement is relatively small, which suggests that using M=K OFDM blocks is sufficient to estimate the CFO.

Figure 7:
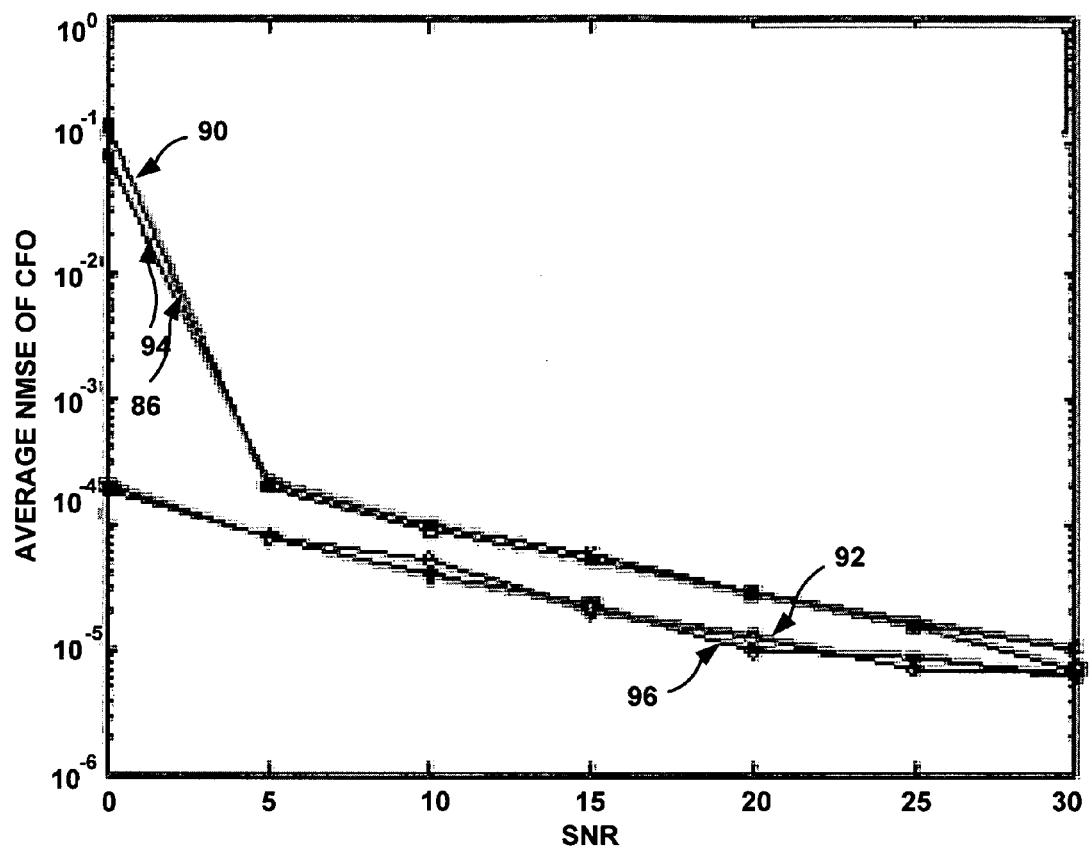

FIG. 7 is a graph comparing the effect of the number of antennas on CFO estimation using the LS channel estimator given in equation (25). The average NMSE of the CFO with the number of blocks M=N are plotted as lines 90, 92, 94, and 96 for systems having $(N_t, N_r)$=(1, 1), $(N_t, N_r)$=(1, 2), $(N_t, N_r)$=(2, 1), $(N_t, N_r)$=(2, 2), respectively. For plots 90 and 92 4 non-zero pilot symbols and one null subcarrier per OFDM transmission block are used. FIG. 7 illustrates that as the number of receive antennas increases, the performance of the CFO estimation techniques described herein increases due to the receive-diversity gains.

Figure 8:
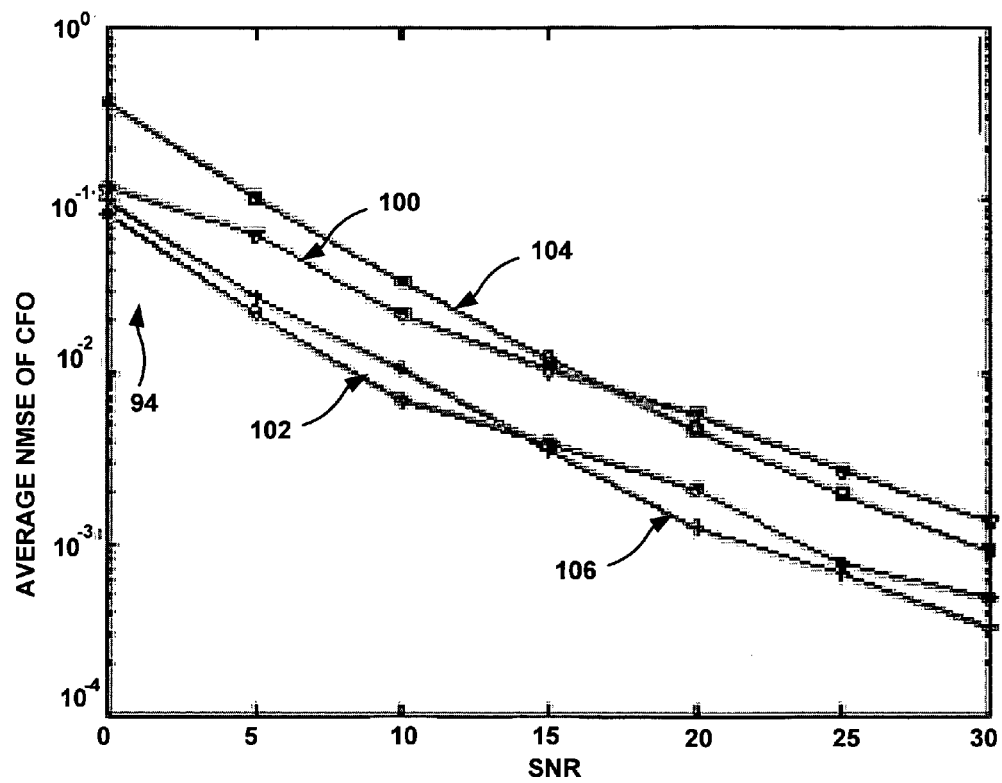

FIG. 8 is a graph comparing the CFO estimation techniques described herein with a technique described in M. Morelli and U. Mengali, "An improved frequency offset estimator for OFDM applications," IEEE Communications Letters, vol. 3, pp. 75-77, March 1999, for the single antenna case. For the presently described techniques, one non-zero training symbol and one zero training symbol for each block are used for each OFDM transmission block and 64 blocks are collected to perform CFO estimation. In order to maintain the same transmission rate, M. Morelli's and U. Mengali's previously referenced technique has a training block length of 128 with 8 identical parts. FIG. 8 depicts two cases: random CFO in [−0.06Π, 0.06Π] and fixed CFO with $\omega_o$=Π/128. In both cases the CFO is chosen within the acquisition range of M. Morelli and U. Mengali's previously referenced technique. In both cases, the CFO techniques described herein, 100 and 102 for the fixed CFO case and the varying CFO case, respectively, are comparable with M. Morelli and U. Mengali's technique for the fixed CFO case 104 and varying CFO case 106.

Figure 9:
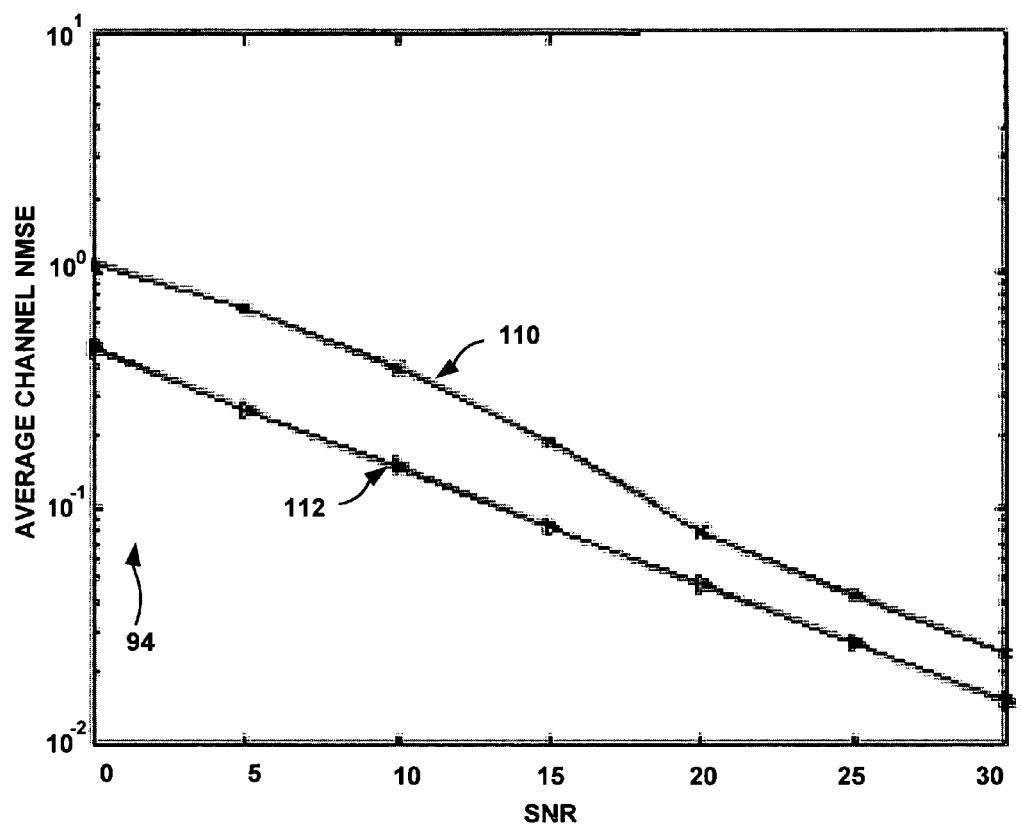

FIG. 9 is a graph comparing the performance of MIMO channel estimation with $(N_t, N_r)$=(2, 2) and the CFO being randomly selected in the range [−0.5Π, 0.5Π]. By collecting 64 observations from 8 OFDM transmission blocks and using the LS channel estimator given in equation (25), the MIMO channels can be estimated. In order to measure the channel estimation quality, the average channel NMSE is computed as $$E\left[\|\hat{h} - h\|^2 / \|h\|^2\right],$$

where $\hat{h}$ is obtained using the LS method. The performance for MIMO OFDM transmissions with estimated CFO 110 using the techniques described herein are compared with the ideal case in which the CFO is perfectly known 112. FIG. 9 illustrates a 4.5 dB loss due to the CFO estimation error.

Figure 10:
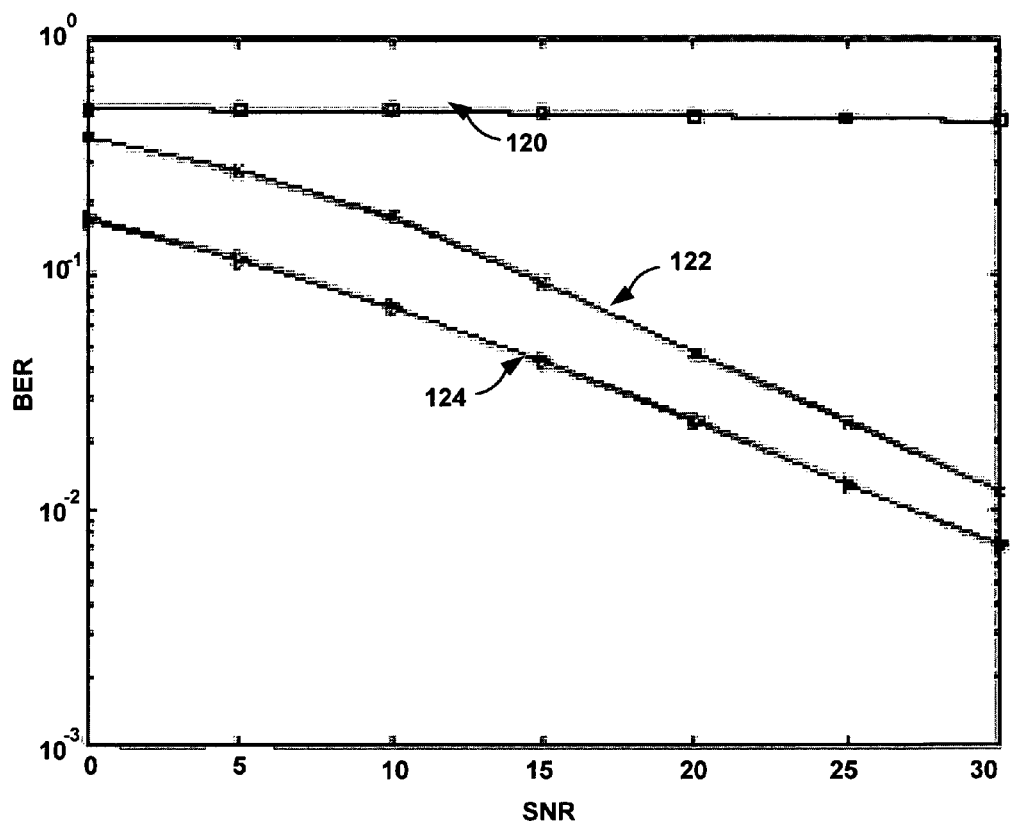

FIG. 10 compares the BER performance of the CFO and channel estimation techniques described herein without phase noise estimation (plot 120), with phase noise estimation (plot 122), and with perfect phase noise estimation (plot 124) with increasing SNR. The simulation parameters are the same as those used in FIG. 9 and zero-forcing equalization is used to estimate the information-bearing symbols. The BER performance of all the simulations degrades as the number of blocks increase due to phase noise. As expected, the plot with phase noise estimation 122 performs better than the plot without phase noise estimation 120 and the plot with perfect phase noise estimation 124 provides a benchmark.

Figure 11:
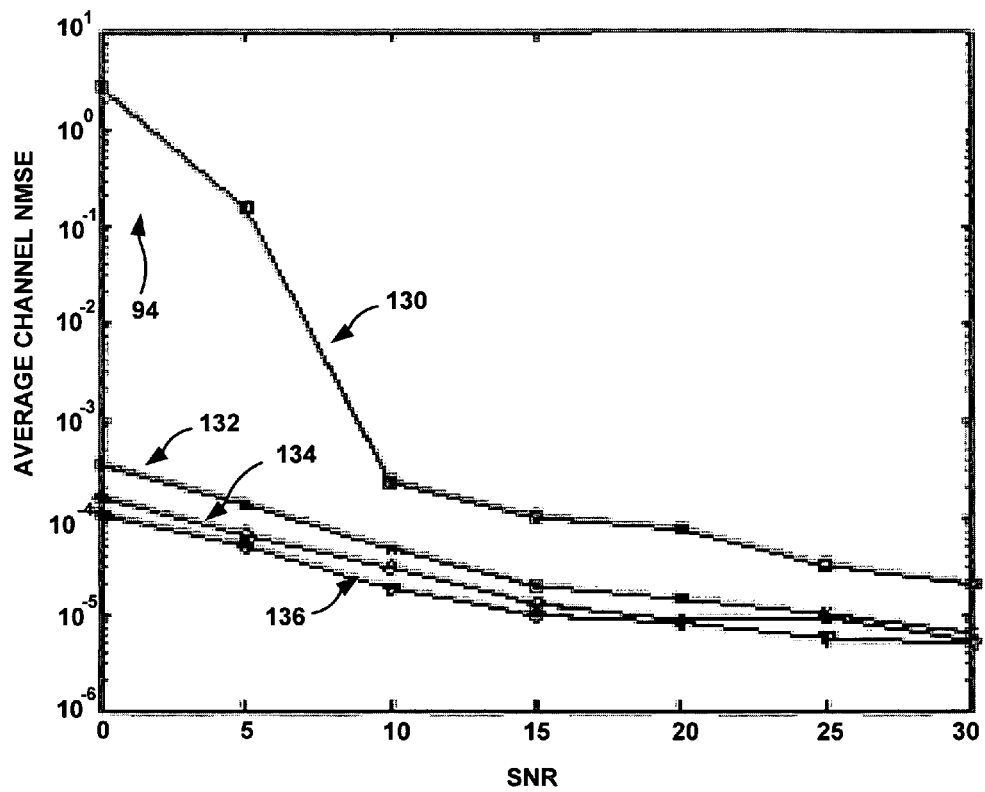
Figure 12:
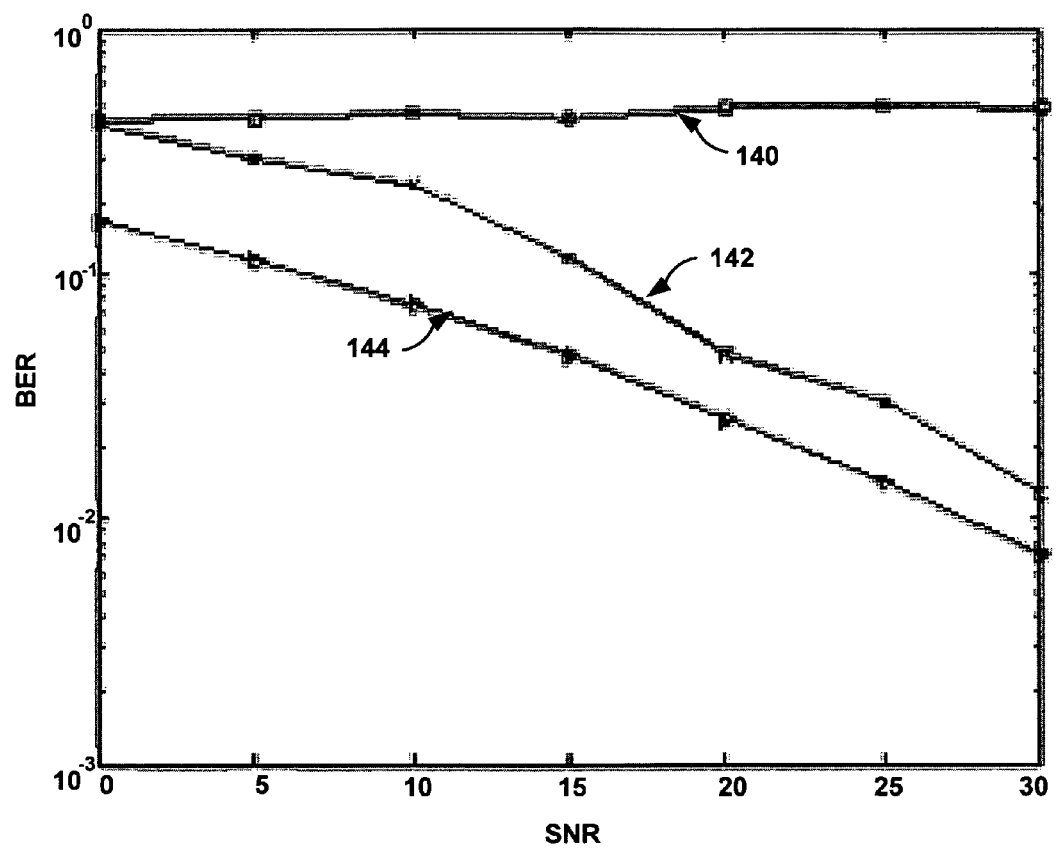

FIGS. 11 and 12 compare the estimation of $N_r$ CFOs in multi-user broadcast OFDM systems. Simulations are performed with $(N_t, N_r)=(2, 2)$ and CFOs are randomly selected in the range $[-0.5\Pi, 0.5\Pi]$. In particular, FIG. 11 illustrates the average channel NMSE with varying SNRs using a $N_{r\times}1$ vector CFO estimator for the presently described techniques with M=L+1 (plot 130), M=K (plot 132), 2K (plot 134), 3K (plot 136). Similarly, FIG. 12 illustrates the BER performance with varying SNRs using the presently described CFO and channel estimation techniques without phase noise estimation (plot 140), with phase noise estimation (plot 142), and with perfect phase noise estimation (plot 144). FIGS. 11 and 12 illustrate results which corroborate with FIGS. 9 and 10 respectively. Consequently, the described techniques which were illustrated in detail for a single-user system involving $N_1$ transmit antennas and $N_r$ receive antennas, can be applied with similar results in a multi-user downlink scenario where the base station deploys $N_t$ transmit antennas to broadcast OFDM based transmissions to $N_r$ mobile stations each of which is equipped with one or more antennas.

Various embodiments of the invention have been described. The invention provides techniques for carrier frequency offset (CFO) and channel estimation of orthogonal frequency division multiplexing (OFDM) transmissions over multiple-input multiple-output (MIMO) frequency-selective fading channels. In particular, techniques are described that utilize training symbols in a manner that CFO and channel estimation are decoupled from symbol detection at the receiver. Unlike conventional systems in which training symbols are inserted within a block of space-time encoded information-bearing symbols to form a transmission block, the techniques described herein insert training symbols over two or more transmission blocks.

The described techniques can be embodied in a variety of transmitters and receivers used in downlink operation including cell phones, laptop computers, handheld computing devices, personal digital assistants (PDA's), and other devices. The devices may include a digital signal processor (DSP), field programmable gate array (FPGA), application specific integrated circuit (ASIC) or similar hardware, firmware and/or software for implementing the techniques. If implemented in software, a computer readable medium may store computer readable instructions, i.e., program code, that can be executed by a processor or DSP to carry out one of more of the techniques described above. For example, the computer readable medium may comprise random access memory (RAM), read-only memory (ROM), non-volatile random access memory (NVRAM), electrically erasable programmable read-only memory (EEPROM), flash memory, or the like. The computer readable medium may comprise computer-readable instructions that when executed in a wireless communication device, cause the wireless communication device to carry out one or more of the techniques described herein. These and other embodiments are within the scope of the following claims.

The invention claimed is:

1. A method comprising:
    forming, by a wireless communication device, two or more blocks of symbols by inserting training symbols within each of two or more blocks of information-bearing symbols;
    applying, by the wireless communication device, a hopping code to each of the two or more blocks of symbols to insert a null subcarrier at a different position within each of the two or more blocks of symbols; and
    outputting, by the wireless communication device, a wireless transmission signal in accordance with the two or more blocks of symbols,
    wherein the hopping code is applied to insert the null subcarriers at different positions in the two or more blocks of symbols such that a second wireless communication device is operable to receive a wireless signal from the outputted wireless transmission signal and to estimate a carrier frequency offset of the received wireless signal based on the positions of the null subcarriers.

2. The method of claim 1, further comprising encoding the information-bearing symbols in space and time.

3. The method of claim 1, wherein the blocks of information-bearing symbols comprises a first block of information-bearing symbols and a second block of information-bearing symbols, and forming blocks of symbols comprises:
    forming a first block of symbols from the first block of information-bearing symbols and the block of training symbols;
    applying a first permutation matrix the second block of information-bearing symbols to rearrange the order of the information-bearing symbols within the second block;
    applying a second permutation matrix to the block of training symbols to rearrange the order of the training symbols; and
    forming a second block of symbols from the second block having rearranged information-bearing symbols and the block of rearranged training symbols.

4. The method of claim 3, wherein the first permutation matrix and the second permutation matrix are mutually orthogonal.

5. The method of claim 3, wherein the first permutation matrix comprises the last $N_c$ columns of an identify matrix having $N_c+N_b$ columns, where $N_c$ represents the number of information-bearing symbols within each of the blocks and $N_b$ represents the number of training symbols within the block of training symbols.

6. The method of claim 3, wherein the second permutation matrix comprises the first $N_b$ columns of an identify matrix having $N_c+N_b$ columns, where $N_c$ represents the number of information-bearing symbols in each of the blocks and $N_b$ represents the number of training symbols of the block of training symbols.

7. The method of claim 3, wherein forming the first block of symbols and forming the second block of symbols comprises forming the first block of symbols and forming the second block of symbols in a format that the blocks of information-bearing symbols and the blocks of training symbols are separable based on the null subcarriers.

8. The method of claim 1, wherein applying a hopping code comprises inserting two or more subcarriers within each of the blocks of symbols.

9. The method of claim 1, wherein applying a hopping code comprises inserting N−K null subcarriers within each of the blocks of symbols, where N represents a length of each block, and $K=N_c+N_b$, where $N_c$ represents the number of information-bearing symbols in each block of symbols and $N_b$ represents the number of training symbols inserted in the block of information-bearing symbols.

10. The method of claim 1, wherein outputting a wireless communication signal comprises outputting an orthogonal frequency divisional multiplexing (OFDM) signal.

11. The method of claim 10, wherein the position of the null subcarrier changes from block to block by N/(L+1) symbols, where N represents a length of each block and L represents an order of a wireless communication channel through which the signal is transmitted.

12. The method of claim 1, wherein the null subcarrier is a zero symbol.

13. The method of claim 1, wherein outputting the wireless transmission signal comprises inserting a cyclic prefix within each of the block of symbols and applying an inverse fast fourier transform (IFFT) of the blocks of symbols.

14. A method comprising:
  receiving, by a wireless communication device, a wireless signal transmitted from a stream of two or more blocks of symbols, wherein each of the two or more blocks of symbols includes one or more information-bearing symbols, one or more training symbols, and at least one null subcarrier at a different position within each of the two or more blocks of symbols;
  estimating, by the wireless communication device, a carrier frequency offset of the received wireless signal based on the positions of the null subcarriers in the two or more blocks of symbols; and
  outputting, by the wireless communication device, estimated symbols based on the received wireless signal and the estimated carrier frequency offset.

15. The method of claim 14, further comprising:
  applying a de-hopping code to the received signal to arrange the null subcarriers in different blocks of the received signal so that the subcarriers in the different blocks are located within the same position; and
  estimating a communication channel based on the training symbols within the received signal,
  wherein estimating the carrier frequency offset of the received wireless signal comprises estimating the carrier frequency offset based on the position of the null subcarriers upon applying the de-hopping code, and
  wherein outputting the estimated symbols comprises outputting the estimated symbols based on the estimated carrier frequency offset and the estimated communication channel.

16. The method of claim 15, where estimating a carrier frequency offset comprises:
  forming the carrier frequency offset of the received signal based on the position of the null subcarriers;
  applying a fast fourier transform (FFT) to the de-hopped blocks of symbols; and
  removing the null subcarriers based on the carrier frequency offset.

17. The method of claim 15, wherein estimating a communication channel comprises:
  collecting M blocks of the signal, where $M \geq 2$;
  separating the block of training symbols from the information-bearing symbols for each of the M collected blocks; and
  forming an estimate of the communication channel based on the training symbols collected from M blocks.

18. The method of claim 17, further comprising selecting M based on at least one of a coherence time of the communication channel and a burst duration of the received signal.

19. The method of claim 17, wherein forming an estimate of the communication channel comprises forming at least one of a linear minimum mean-square channel estimate or a least squares channel estimate.

20. The method of claim 17, wherein $M=L+1$, where L represents an order of the communication channel.

21. The method of claim 15,
  wherein receiving the wireless signal comprises receiving the signal from a plurality of receive antennas; and
  wherein outputting estimated symbols further comprises:
    estimating a phase noise of the received signal based on the estimated carrier frequency offset estimate from the plurality of receive antennas; and
    outputting the estimated symbols as a function of the estimated phase noise.

22. The method of claim 14, wherein receiving a wireless signal comprises:
  receiving an orthogonal frequency divisional multiplexing (OFDM) signal having cyclic prefixes; and
  processing the OFDM transmission signal to remove the cyclic prefixes.

23. The method of claim 14, wherein receiving a wireless signal comprises receiving a wireless signal that is encoded is space and time.

24. A wireless communication device comprising:
  a training symbol insertion module to form two or more blocks of symbols by inserting training symbols within each of two or more blocks of information-bearing symbols, wherein the training symbol insertion module applies a hopping code to each of the two or more blocks of symbols to insert a null subcarrier at a different position within each of the two or more blocks of symbols; and
  a modulator to output a wireless transmission signal in accordance with the two or more blocks of symbols,
  wherein the wireless communication device applies the hopping code to insert the null subcarriers at different positions in the two or more blocks of symbols such that a second wireless communication device is operable to receive a wireless signal from the outputted wireless transmission signal and to estimate a carrier frequency offset of the received wireless signal based on the positions of the null subcarriers.

25. The wireless communication device of claim 24, further comprising a space-time encoder to encode the blocks of information-bearing symbols in space and time.

26. The wireless communication device of claim 24, wherein the training symbol insertion module forms the blocks of symbols by:
  applying a first permutation matrix to each of the blocks of information-bearing symbols to rearrange the order of the information-bearing symbols within the blocks;
  applying a second permutation matrix to the block of training symbols to rearrange the order of the training symbols; and
  forming the block of symbols by combining the blocks of rearranged information-bearing symbols with the block of rearranged training symbols.

27. The wireless communication device of claim 26, wherein the first permutation matrix and the second permutation matrix are mutually orthogonal.

28. The wireless communication device of claim 26, wherein the first permutation matrix comprises the last $N_c$ columns of an identify matrix having $N_c+N_b$ columns, where $N_c$ represents the number of information-bearing symbols within each of the blocks and $N_b$ represents the number of training symbols within the block of training symbols.

29. The wireless communication device of claim 26, wherein the second permutation matrix comprises the first $N_b$ columns of an identify matrix having $N_c+N_b$ columns, where $N_c$ represents the number of information-bearing symbols in each of the blocks and $N_b$ represents the number of training symbols of the block of training symbols.

30. The wireless communication device of claim 24, wherein the training symbol insertion module applies a hopping code to inserting N−K null subcarriers within each of the blocks of symbols, where N represents a length of each block, and $K=N_c+N_b$, where $N_c$ represents the number of information-bearing symbols in each block of symbols and $N_b$ represents the number of training symbols inserted in the block of information-bearing symbols.

31. The wireless communication device of claim 24, wherein the modulator outputs an orthogonal frequency divisional multiplexing (OFDM) signal.

32. The wireless communication device of claim 24, wherein the training symbol insertion module applies the hopping code to change the position of the null subcarrier by N/(L+1) symbols from block to block, where N represents a length of each block and L represents an order of a wireless communication channel through which the signal is transmitted.

33. The wireless communication device of claim 24, wherein the null subcarrier is a zero symbol.

34. The wireless communication device of claim 24, wherein the wireless communication device comprises a mobile device or a base station.

35. The wireless communication device of claim 24,
wherein the training symbol insertion module comprise executable instructions, and
wherein the wireless communication device comprises a digital signal processor to execute the instructions.

36. A wireless communication device comprising:
one or more antennas that receive a wireless signal transmitted from a stream of two or more blocks of symbols, wherein each of the two or more blocks of symbols includes one or more information-bearing symbols, one or more training symbols, and at least one null subcarrier at a different position within each of the two or more blocks of symbols;
a carrier frequency offset estimator to estimate a carrier frequency offset of the received wireless signal based on the positions of the null subcarriers in the two or more blocks of symbols; and
a decoder to output a stream of estimated symbols based on the received wireless signal and the estimated carrier frequency offset.

37. The wireless communication device of claim 36, wherein the carrier frequency offset estimator:
applies a de-hopping code to the received signal to arrange the null subcarriers in different blocks of the received signal so that the subcarriers in the different blocks are located within the same position, and
estimates, upon applying the de-hopping code, the carrier frequency offset of the received signal based on the position of the null subcarriers.

38. The wireless communication device of claim 36, further comprising a channel estimation unit to compute an estimate of a communication channel based on the training symbols within the received signal,
wherein the decoder outputs the estimated symbols based on the estimated carrier frequency offset and the estimated communication channel.

39. The wireless communication device of claim 36, further comprising a phase estimation unit that estimates a phase noise of the received signal and outputs the estimated symbols as a function of the estimated phase noise.

40. The wireless communication device of claim 36, wherein the wireless communication device comprises a mobile device or a base station.

41. The wireless communication device of claim 36,
wherein the carrier frequency offset estimator and the decoder comprise executable instructions, and
wherein the wireless communication device comprises a digital signal processor to execute the instructions.

42. A non-transitory computer-readable storage medium, comprising instructions that cause a processor of a wireless communication device to:
form two or more blocks of symbols by inserting training symbols within each of two or more blocks of information-bearing symbols;
apply a hopping code to each of the two or more blocks of symbols to insert a null subcarrier at a different position within each of the two or more blocks of symbols; and
output wireless transmission signal in accordance with the two or more blocks of symbols,
wherein the hopping code is applied to insert the null subcarriers at different positions in the two or more blocks of symbols such that a second wireless communication device is operable to receive a wireless signal from the outputted wireless transmission signal and to estimate a carrier frequency offset of the received wireless signal based on the positions of the null subcarriers.

43. A non-transitory computer-readable storage medium, comprising instructions that cause a processor of a wireless communication device to:
receive a wireless signal transmitted from a stream of two or more blocks of symbols, wherein each of the two or more blocks of symbols includes one or more information-bearing symbols, one or more training symbols, and at least one null subcarrier at a different position within each of the two or more blocks of symbols;
estimate a carrier frequency offset of the received wireless signal based on the null subcarriers included in the two or more blocks of symbols; and
output estimated symbols based on the received wireless signal and the estimated carrier frequency offset.

* * * * *